(12) United States Patent
Matsuo et al.

(10) Patent No.: US 8,810,713 B2
(45) Date of Patent: Aug. 19, 2014

(54) IMAGE PICKUP APPARATUS AND IMAGE PICKUP DEVICE FOR PERFORMING AUTO-FOCUSING

(75) Inventors: Keigo Matsuo, Kunitachi (JP); Hisashi Goto, Tokyo (JP); Yoshikazu Ichikawa, Hachioji (JP); Ryuhi Okubo, Asaka (JP); Hiroshi Takase, Hachioji (JP); Toshio Takahashi, Hachioji (JP); Daichi Murakami, Hachioji (JP)

(73) Assignees: Olympus Imaging Corp. (JP); Olympus Corporation (JP)

( * ) Notice: Subject to any disclaimer, the term of this patent is extended or adjusted under 35 U.S.C. 154(b) by 80 days.

(21) Appl. No.: 13/545,400

(22) Filed: Jul. 10, 2012

(65) Prior Publication Data

US 2013/0016274 A1 Jan. 17, 2013

(30) Foreign Application Priority Data

Jul. 13, 2011 (JP) .................................. 2011-155120
Aug. 10, 2011 (JP) .................................. 2011-175317
Aug. 10, 2011 (JP) .................................. 2011-175402

(51) Int. Cl.
*H04N 5/232* (2006.01)

(52) U.S. Cl.
USPC .......................................... 348/345; 348/349

(58) Field of Classification Search
None
See application file for complete search history.

(56) References Cited

U.S. PATENT DOCUMENTS

| 7,209,175 | B1 * | 4/2007 | Kurokawa et al. | 348/345 |
| 2010/0045849 | A1 * | 2/2010 | Yamasaki | 348/349 |
| 2010/0245631 | A1 * | 9/2010 | Hoda et al. | 348/241 |
| 2010/0302432 | A1 * | 12/2010 | Komuro | 348/340 |
| 2011/0249150 | A1 * | 10/2011 | Shintani et al. | 348/240.3 |
| 2013/0169858 | A1 * | 7/2013 | Yamasaki | 348/350 |

FOREIGN PATENT DOCUMENTS

JP 2007-155929 6/2007
JP 2009-290157 12/2009

* cited by examiner

*Primary Examiner* — Lin Ye
*Assistant Examiner* — John H Morehead, III
(74) *Attorney, Agent, or Firm* — Volpe and Koenig, P.C.

(57) ABSTRACT

An image pickup apparatus includes: an image pickup device that includes a pixel used for focus detection, a plurality of the pixels being arranged in a matrix; a correction memory that stores correction information used for correcting a difference in amounts of received light that depend on pixel positions of the pixels used for focus detection; a correcting section that reads the correction information to correct a pixel value of the pixel used for focus detection; and a focus detecting section that detects a focal point by using the pixel value corrected by the correcting section. Focus accuracy is increased by correcting the pixel value for an AF pixel depending on the pixel position.

11 Claims, 26 Drawing Sheets

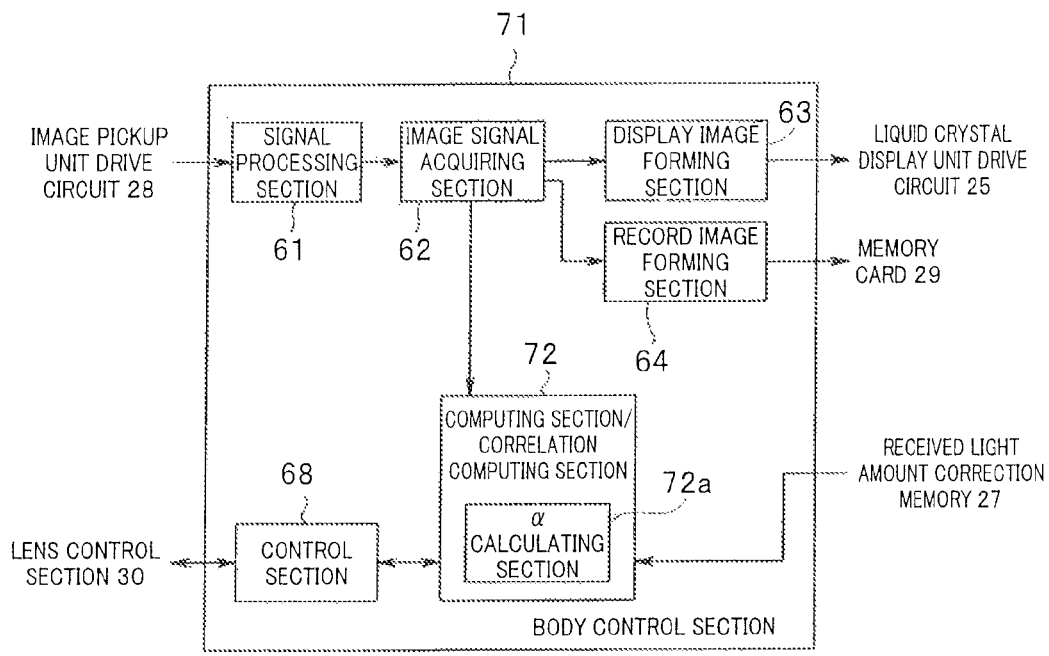

IMAGE PICKUP APPARATUS AND IMAGE PICKUP DEVICE FOR PERFORMING AUTO-FOCUSING

This application claims benefit of Japanese Applications No. 2011-155120 filed in Japan on Jul. 13, 2011 and No. 2011-175317 filed in Japan on Aug. 10, 2011 and No. 2011-175402 filed in Japan on Aug. 10, 2011, the contents of which are incorporated by this reference.

BACKGROUND OF THE INVENTION

1. Field of the Invention

The present invention relates to an image pickup apparatus that has an autofocus function and to an image pickup device.

2. Description of the Related Art

Recently, a number of portable appliances with a photographing capability such as a digital camera (image pickup apparatus) have been equipped with an autofocus function. Some image pickup apparatuses of this type use an image pickup device that incorporates pixels for focus detection (hereinafter referred to as "AF pixel") in addition to image pickup pixels (normal pixels) for forming images so as to implement a pupil split phase difference method for autofocus. In this approach, a pupil is split into right and left, and AF pixels with image pickup units that separately receive a luminous flux passing through the right or left pupil need to be built into an image pickup device. Autofocus can be faster by performing a computation on an image signal from such a variety of AF pixels (hereinafter referred to as "AF computation" or "correlation computation") to generate an AF signal for focusing and performing focusing.

To improve autofocusing performance, however, a relatively large number of AF pixels need to be arranged in the image pickup device, and lack of image signal of the AF pixel portions disadvantageously causes degradation of picked-up image quality.

For this reason, Japanese Patent Application Laid-Open Publication No. 2007-155929 proposes a technique for reducing the number of AF pixels by using normal pixels to estimate pixel values for AF pixels.

Some other image pickup devices include microlenses disposed over the respective pixels. The microlenses are eccentric depending on pixel positions in the image pickup device to appropriately direct light from a taking lens to a light receiving area of each pixel. Japanese Patent Application Laid-Open Publication No. 2009-290157, for example, discloses a technique in which the microlenses are eccentric depending on pixel positions and the light receiving area is defined on a line extending through the center of an exit pupil and the vertex of a microlens. This allows a luminous flux passing through a right or left pupil to reliably impinge on a separate right or left AF pixel, and AF accuracy is therefore improved.

SUMMARY OF THE INVENTION

An image pickup apparatus according to an aspect of the invention includes: an image pickup device that includes pixels used for focus detection, the pixels being arranged in a matrix; a correction memory that stores correction information used for correcting a difference in amounts of received light that depend on pixel positions of the pixels used for focus detection; a correcting section that reads the correction information to correct a pixel value of the pixel used for focus detection; and a focus detecting section that detects a focal point by using the pixel value corrected by the correcting section.

Further, an image pickup device according to an aspect of the invention is an image pickup device including a plurality of pixels arranged in a matrix, the pixels including an image pickup pixel and a pixel for focus detection, the pixels each including: a light receiving area on which light from a taking lens impinges; and a microlens that directs light from the taking lens to the light receiving area, wherein plural types of the pixel for focus detection are provided in association with a plurality of assumed design pupil positions, and an end of the light receiving area of the pixel for focus detection is defined in association with a positional relationship between the design pupil position and the microlens.

Still further, an image pickup device according to an aspect of the invention is an image pickup device including a plurality of pixels arranged in a matrix, the pixels including an image pickup pixel and a pixel for focus detection, the pixels each including: an effective light receiving area that is a part of a photoelectric conversion area and on which light regulated by a light shielding section from a taking lens impinges; and a microlens that directs light from the taking lens to the effective light receiving area, wherein an end of the effective light receiving area of the pixel for focus detection is defined in association with a positional relationship between an assumed design pupil position and the microlens.

The above and other objects, features and advantages of the invention will become more clearly understood from the following description referring to the accompanying drawings.

BRIEF DESCRIPTION OF THE DRAWINGS

FIG. 12 is a block diagram illustrating an example of a specific configuration of a body control section used in a second embodiment;

FIG. 13 is an explanatory diagram for illustrating information stored in a received light amount correction memory 17;

DETAILED DESCRIPTION OF THE PREFERRED EMBODIMENTS

Embodiments of the invention will now be described in detail with reference to drawings.

First Embodiment

Figure 1:
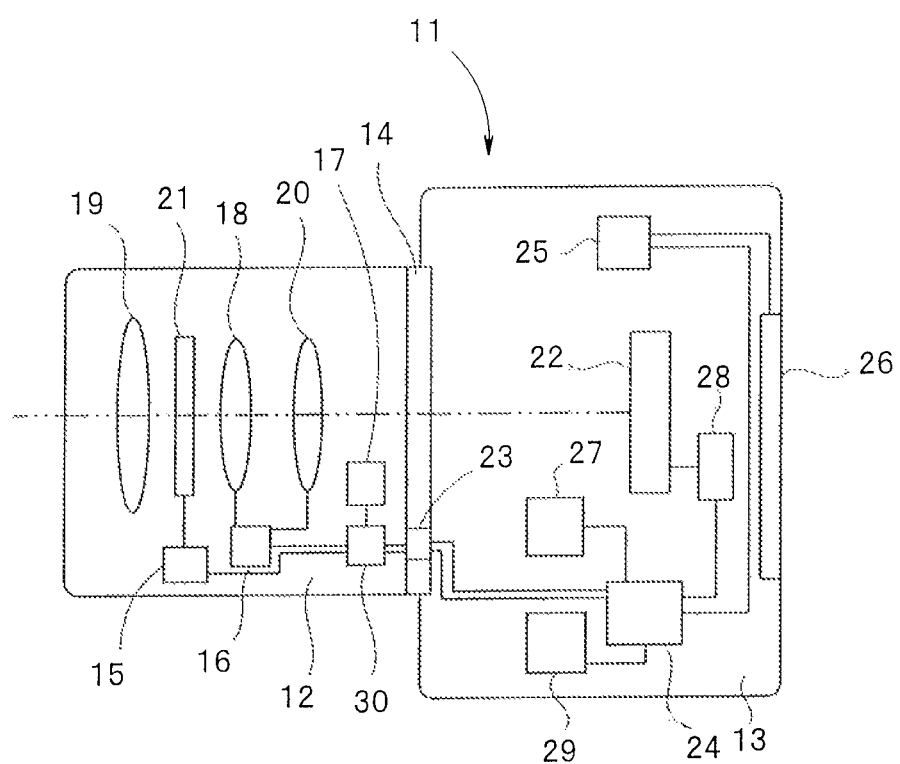
FIG. 1 is a block diagram illustrating a camera including an image pickup apparatus according to a first embodiment of the invention.

FIG. 1 is a block diagram illustrating a camera including an image pickup apparatus according to a first embodiment of the invention, In FIG. 1, a digital camera 11 is composed of an interchangeable lens 12 and a camera body 13, and the interchangeable lens 12 is attached to the camera body 13 via a mount unit 14.

The interchangeable lens 12 is provided with a lens control section 30, a lens drive section 16, a diaphragm drive section 15, a zooming lens 18, a stationary lens 19, a focusing lens 20, and a diaphragm 21. The lens control section 30 is composed of a microcomputer and peripheral components such as a memory, and is responsible for tasks such as drive control for the focusing lens 20 and the diaphragm 21, state detection for the zooming lens 18 and the focusing lens 20, and transmission of lens information to and reception of camera information from the body control section 24.

The diaphragm drive section 15 controls an aperture size of the diaphragm 21 through the lens control section 30 based on a signal from the body control section 24. The lens drive section 16 drives the zooming lens 18 and the focusing lens 20 through the lens control section 30 based on a signal from the body control section 24.

In the embodiment, the interchangeable lens 12 is provided with a received light amount correction memory 17. The received light amount correction memory 17 stores lens-side information used for correcting the amount of received light of an AF pixel or the like depending on the pixel position, i.e. lens-side correction information, such as an f-number, a zoom state, and a position of the focusing lens. The lens control section 30 is adapted to read the lens-side correction information stored in the received light amount correction memory 17 and transmit the information to the body control section 24.

The camera body 13 is provided with an image pickup unit 22, a body control section 24, a liquid crystal display unit drive circuit 25, a liquid crystal display unit 26, a memory card 29, and other components. The image pickup unit 22 includes a light receiving section that has a pixel arrangement such as one shown in FIG. 4, which will be described later, or the like. Specifically, pixels are arranged in a two dimensional arrangement in the light receiving section, which is disposed on a predetermined image forming plane of the interchangeable lens 12 and picks up an object image formed by the interchangeable lens 12. AF pixels are arranged at predetermined focus detection positions in the light receiving section of the image pickup unit 22.

The body control section 24 is composed of a microcomputer and peripheral components such as a memory, and is responsible for tasks such as reading of image signals from the image pickup unit 22, correction for an image signal, detection of the state of focus adjustment for the interchangeable lens 12, reception of lens information from the lens control section 30 and transmission of camera information (defocus amount), and operation control of the entire digital camera, through an image pickup unit drive circuit 28. The body control section 24 and the lens control section 30 communicate with each other through an electric contact unit 23 on the mount unit 14 and exchange various information.

The liquid crystal display unit drive circuit 25 drives the liquid crystal display unit 26. The liquid crystal display unit 26 allows a photographer to view picked-up images. The memory card 29 can be attached to and detached from the camera body 13, and is a portable storage media for storing or recording image signals.

An object image formed on the image pickup unit 22 through the interchangeable lens 12 is photoelectrically converted by the image pickup unit 22 and the output is sent to the body control section 24. The body control section 24 causes the memory card 29 to store image data generated based on the output from the image pickup unit 22 and sends an image signal to the liquid crystal display unit drive circuit 25, causing the liquid crystal display unit 26 to display the image.

The camera body 13 is provided with unillustrated operation members (such as a shutter button and a focus detection position setting member). The body control section 24 detects operated state signals from the operation members and the camera body 13 controls operations (image pickup operation, focus detection position setting, and image processing) according to detected results.

The lens control section 30 changes the lens information based on a focusing state, a zooming state, a diaphragm setting state, a diaphragm maximum aperture f-number, and the like. Specifically, the lens control section 30 monitors positions of the lens 18 and the focusing lens 20 and a diaphragm position of the diaphragm 21, and computes lens information according to the monitoring information or selects lens information from a look-up table provided in advance according to the monitoring information. The lens control section 30 moves the focusing lens 20 to a focal point based on a received lens drive amount by an actuator such as a motor in the lens drive section 16.

In the embodiment, the camera body 13 is provided with a received light amount correction memory 27. The received light amount correction memory 27 stores body-side correction information used for correcting the amount of received light of an AF pixel or the like depending on the pixel position. For example, the received light amount correction memory 27 stores a table for received light amount correction coefficients α that depend on pixel positions for each f-number as body-side correction information. The body control section 24 acquires a received light amount correction coefficient α to correct a pixel value of a pixel used for focus control depending on the pixel position based on the lens-side correction information read from the memory 17 in the interchangeable lens 12 and the body-side correction information read from the received light amount correction memory 27. The body control section 24 reads a pixel value of an AF pixel or the like from the image pickup unit 22, and corrects the read pixel value by using a received light amount correction coefficient α depending on the pixel position. The body control section 24 thereafter calculates a defocus amount in a predetermined focus detection area by using the corrected pixel value based on a pupil split phase difference method and generates an output as an AF signal. The AF signal is supplied to the lens control section 30. The lens control section 30 calculates a lens drive amount based on the AF signal, and controls the lens drive section 16 according to the lens drive amount to perform focusing.

Figure 2A:
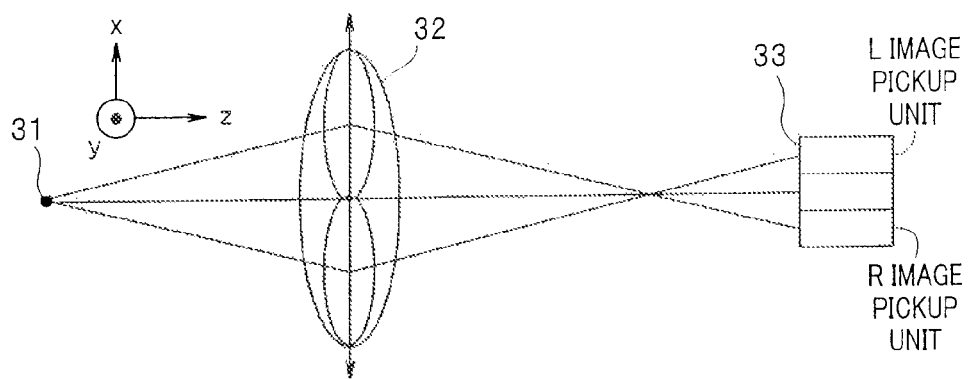
FIGS. 2A to 2C are explanatory diagrams for illustrating a pupil split phase difference method.
Figure 2B:
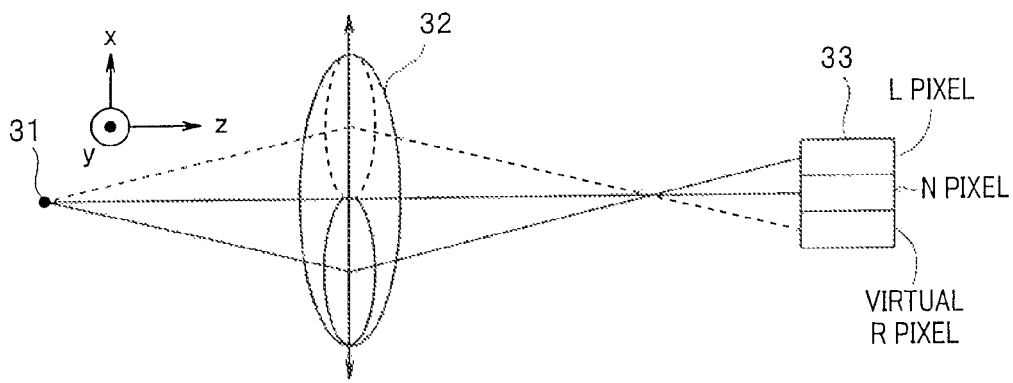
Figure 2C:
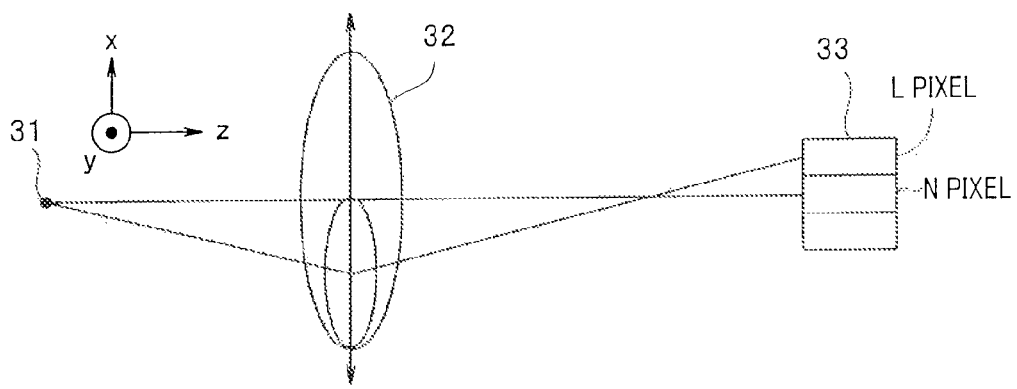

With reference to FIGS. 2A to 2C and FIGS. 3 to 9, description will now be made to information stored in memories 17 and 27 for correcting an AF pixel value. FIGS. 2A to 2C are explanatory diagrams for illustrating a pupil split phase difference method.

Optical images entering the image pickup apparatus via the respective optical paths from one point 31 of an object are formed by the taking lens 32 on a plane of incidence of the image pickup device 33. In FIGS. 2A to 2C, X direction represents a horizontal direction, z direction represents an optical axis direction of the taking lens 32, and y direction (perpendicular to the plane of the paper) represents a vertical direction. In FIGS. 2A to 2C, each of boxes of the image pickup device 33 represents a pixel. Two image pickup units (for example, an R image pickup unit and an L image pickup unit) are configured to be pixels for AF detection (AF pixels) to divide optical paths to right and left directions, that is an exit pupil is split into right and left. A luminous flux passing through the right pupil (right ray) and a luminous flux passing through the left pupil (left ray) impinge on the R image pickup unit and the L image pickup unit, respectively. For example, the R and L image pickup units can be arranged eccentrically relative to the optical axis of the taking lens 32 to allow the right and left rays to impinge on the R and L image pickup units, respectively.

When the object is in focus, the R and L image pickup units of the same pixel receive rays from substantially the same point on the object. Therefore, an image signal obtained by a plurality of R image pickup units and an image signal obtained by a plurality of L image pickup units for AF detection arranged in the horizontal direction are identical. As shown in FIG. 2A, when the object is out of focus, rays from the same point on the object impinge on the R and L image pickup units at displaced positions depending on focus deviation. Therefore, an image signal obtained by a plurality of R image pickup units and an image signal obtained by a plurality of L image pickup units for AF detection arranged in the horizontal direction are shifted in terms of phase, and the amount of phase shifts corresponds to the focus deviation. Based on a phase difference between image signals obtained by the R and L image pickup units, autofocusing can be achieved by driving a lens for focus adjustment.

Incidentally, in order to share a read circuit between an AF pixel and a normal pixel, FIG. 2A shows an example where a pixel that has only an R image pickup unit (hereinafter referred to as "R pixel") and a pixel that has only an L image pickup unit (hereinafter referred to as "L pixel") are used to constitute AF pixels instead of providing both the R and L image pickup units in a pixel Further, FIG. 2B shows an example where the R pixel is omitted and only the L pixel is used as an AF pixel, and a difference between pixel values of a plurality of normal pixels (hereinafter also referred to as "N pixel") and a pixel value of L pixel is used to estimate R pixels (hereinafter referred to as "virtual R pixel"). Phases of image signals obtained by a plurality of virtual R pixels are compared with a phase of an image signal obtained by an L image pickup unit to determine focus deviation.

Further, FIG. 2C shows an example where the R pixel is omitted and only the L pixel is used as an AF pixel, and a phase of an image signal obtained by an N pixel is compared with a phase of an image signal obtained by an L image pickup unit to determine focus deviation.

As the N pixel used for focus detection, it is conceivable to use at least one of green pixels located closest to an AF pixel. When a picked-up image is outputted, an average value of pixel values of green pixels located close to the AF pixel may also used as a pixel value for the AF pixel position. Further, a pixel value for the AF pixel position may be calculated by pixel interpolation including pattern differentiation of surrounding pixels.

Incidentally, if a picked-up image includes a large number of horizontal lines, images obtained by the L image pickup unit and the R image pickup unit may be matched with each other even in case of out focus. In this case, an exit pupil may for example be split into upper and lower and a U image pickup unit that receives a luminous flux passing through the upper pupil and a D image pickup unit that receives a luminous flux passing through the lower pupil may be provided. Focusing can be achieved by comparing a phase of an image signal obtained by a plurality of U image pickup units with a phase of an image signal obtained by a plurality of D image pickup units to detect focus deviation.

Figure 3:
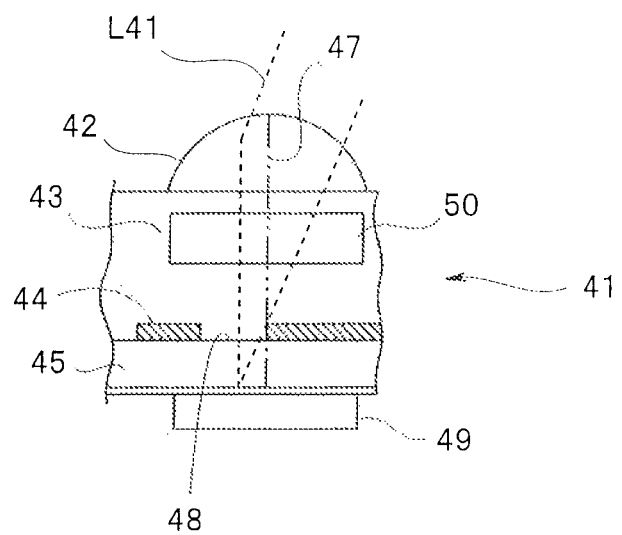
FIG. 3 is a sectional view illustrating a structure of an AF pixel.

FIG. 3 is a sectional view illustrating a structure of such an AF pixel. FIG. 3 shows an example where an opening in a pixel of an image pickup device is eccentric relative to the center of a photoelectric conversion area so as to split an exit pupil. FIG. 3 shows a structure of one pixel of the image pickup device.

A pixel 41 is provided with a microlens 42, a smoothing layer 43 for providing a planar surface for forming the microlens 42, a light shielding film 44 for preventing colors of color pixels from being mixed, a smoothing layer 45 for providing a planar surface on which color filter layers are disposed, and a photoelectric conversion area 49 in this order from the top.

In the pixel 41, the light shielding film 44 also has an opening 48 that is eccentric outward from a center 47 of the photoelectric conversion area 49 and a color filter 50.

As can be seen, in the example in FIG. 3, the opening 48 in the pixel 41 is eccentric relative to the center of a photoelectric conversion area 49. A beam L41 enters, for example, only the L image pickup unit in the photoelectric conversion area 49, and therefore the exit pupil is split.

While FIG. 3 shows an example of splitting the exit pupil by the eccentric opening in the pixel, the exit pupil may be split in various ways. For example, an eccentric on-chip lens may be used to split the exit pupil, or a digital microlens (DML) may be used to split the exit pupil.

Figure 4:
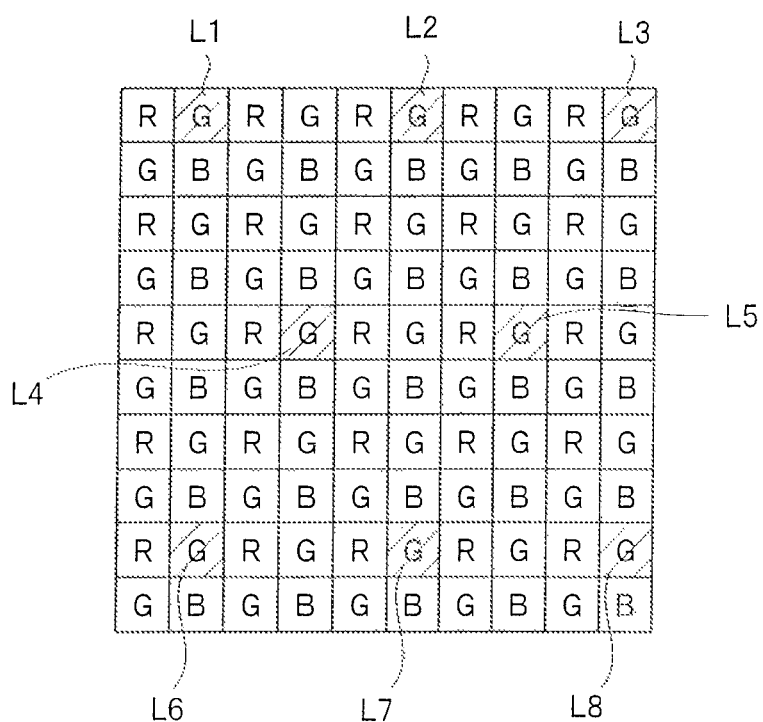
FIG. 4 is an explanatory diagram illustrating an example of a pixel arrangement in an image pickup unit 22.

FIG. 4 is an explanatory diagram illustrating an example of a pixel arrangement in an image pickup unit 22.

In the embodiment, description will be made to an example where the Bayer arrangement is used as a pixel arrangement. In FIG. 4, a character "B" denotes a blue pixel provided with a blue filter, a character "R" denotes a red pixel provided with a red filter, a character "G" denotes a green pixel provided with a green filter, and obliquely hatched portions denote AF pixels. Note that FIG. 4 shows only a part of a light receiving section.

As shown in FIG. 4, in the Bayer arrangement, the same arrangement consisting of a unit of two horizontal pixels by two vertical pixels is repeated. Specifically, in the 2×2 pixels, a blue pixel and a red pixel are obliquely arranged, and the remaining two obliquely arranged pixels are occupied by green pixels. Obliquely hatched pixels L1 to L8 are L pixels. In this way, the AF pixels are located in appropriate places in the light receiving section.

FIGS. 5 to 8 are explanatory diagrams for illustrating a relationship between a pixel position of an AF pixel and a light receiving area in the position.

In FIGS. 5 to 8, a position (address) of a pixel of interest on the light receiving section is represented by (x,y), and the address of a pixel along the optical axis of taking lens (hereinafter referred to as "on-axis pixel") is defined as (0,0). In FIGS. 5 to 8, an ellipse represents a light receiving coverage on a pupil plane for an AF pixel (L pixel), and a dashed-lined circle represents a pupil of the taking lens when the pixel of interest is the on-axis pixel, namely a light receiving coverage 51 on a pupil plane of the on-axis N pixel. An X mark represents the position of the optical axis of taking lens 54.

In FIGS. 5 to 8, patterns in the elliptical area representing a light receiving coverage of an AF pixel schematically indicate an intensity distribution of incident light into the light receiving plane; the incident intensity increases toward the center of the elliptical area, the incident intensity decreases toward the periphery of the elliptical area in the minor axis direction, and the incident intensity is equal on the same line. Such intensity distributions of incident light are caused by light diffraction or the like and dependent on optical structures such as diaphragm, focal length, and pixel structure.

Figure 5:
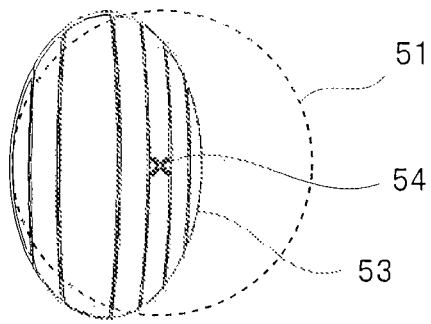
FIG. 5 is an explanatory diagram for illustrating a relationship between a pixel position of an AF pixel and a light receiving area in the position.

FIG. 5 illustrates an example where the pixel of interest is the on-axis pixel. In this case, the light receiving coverage 51 (a pupil of the taking lens) is in a circular shape centered on the position of the optical axis of taking lens 54 indicated by the X mark, while the light receiving coverage 53 of the AF pixel is an ellipse.

As described above, the AF pixel experiences a partial decrease in the incident intensity, while the N pixel does not experience any change in the incident intensity and can receive all luminous fluxes through the pupil of the taking lens. Note that in an on-axis AF pixel, the position of the optical axis of taking lens 54 coincides with the position of the on-chip lens vertex of the AF pixel projected onto the pupil.

Figure 6:
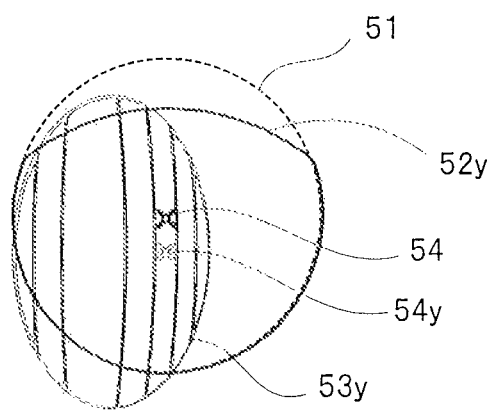
FIG. 6 is an explanatory diagram for illustrating a relationship between a pixel position of an AF pixel and a light receiving area in the position.
Figure 7:
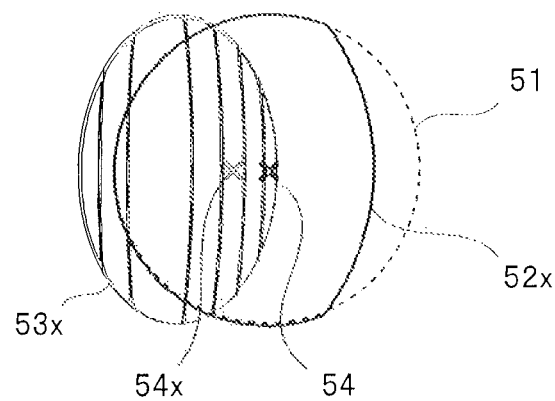
FIG. 7 is an explanatory diagram for illustrating a relationship between a pixel position of an AF pixel and a light receiving area in the position.
Figure 8:
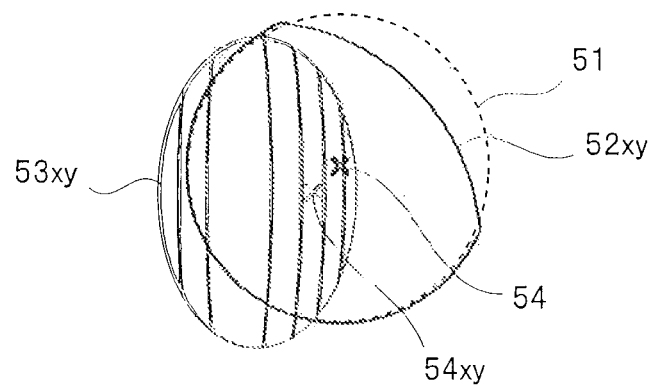
FIG. 8 is an explanatory diagram for illustrating a relationship between a pixel position of an AF pixel and a light receiving area in the position.

FIGS. 6 to 8 illustrate examples where the pixel of interest is a pixel displaced from the position along the optical axis of taking lens (hereinafter referred to as "off-axis pixel"). FIG. 6 illustrates an example where the pixel of interest is an off-axis pixel in an address (0,1) that is displaced in y direction. In this case, because of vignetting effect or the like, an exit pupil associated with a position on the light receiving section, namely a light receiving coverage 52y on the pupil plane of the off-axis N pixel is eclipsed in y direction as compared with the light receiving coverage 51 on the pupil plane of the on-axis N pixel.

As described above, vertexes of on-chip lenses of pixels except one on the optical axis position 54 are eccentric from the center axis of the pixel in order to avoid shading. Consequently, the position of the optical axis of taking lens 54 does not coincide with the position of the on-chip lens vertex of the AF pixel projected onto the pupil 54y, resulting in a displacement in y direction. As a result, a light receiving coverage 53y of the AF pixel in an address (0,1) is displaced in y direction farther than the light receiving coverage 53 of the AF pixel located on the position on the optical axis 54.

FIG. 7 illustrates an example where the pixel of interest is in an address (k,0) that is displaced in x direction from the position along the optical axis of taking lens. In this case, a light receiving coverage 52x on the pupil plane in a case where the pixel of interest is the N pixel is eclipsed in x direction as compared with the light receiving coverage 51 on the pupil plane of the on-axis N pixel.

Further, the position of the optical axis of taking lens 54 does not coincide with the position of the on-chip lens vertex of the AF pixel projected onto the pupil 54x, resulting in a displacement in x direction. As a result, a light receiving coverage 53x of the AF pixel in an address (k,0) is displaced in x direction farther than the light receiving coverage 53 of the AF pixel located on the position on the optical axis 54.

FIG. 8 illustrates an example where the pixel of interest is in an address (k,1) that is displaced in x and y directions from the position along the optical axis of taking lens. In this case, a light receiving coverage 52xy on the pupil plane in a case where the pixel of interest is the N pixel is eclipsed in x and y directions as compared with the light receiving coverage 51 on the pupil plane of the on-axis N pixel.

Further, the position of the optical axis of taking lens 54 does not coincide with the position of the on-chip lens vertex of the AF pixel projected onto the pupil 54xy, resulting in a displacement in x and y directions. As a result, a light receiving coverage 53xy of the AF pixel in an address (k,1) is displaced in x and y directions farther than the light receiving coverage 53 of the AF pixel located on the position on the optical axis 54.

The ellipses in FIGS. 5 to 8 represent examples where the AF pixel is an L pixel. Instead of the L pixel, it is obvious that the light receiving coverage shifts depending on pixel positions even when the AF pixel is a right pupil detecting pixel (R pixel), an upper pupil detecting pixel (U pixel), or a lower pupil detecting pixel (D pixel).

In N pixels, luminous fluxes passing through the light receiving coverages 51, 52y, 52x, and 52xy on the pupil plane of the N pixels enter at predetermined incident intensities. As for N pixels, therefore, the amount of received light, which depends on the area of the light receiving coverage, can be obtained at every pixel position.

On the other hand, AF pixels receive luminous fluxes passing through the light receiving coverages on the pupil plane of the N pixels and the light receiving coverages on the pupil plane of the AF pixels. As described above, the luminous fluxes have different incident intensities at different positions in the light receiving coverage. As for AF pixels, therefore, in areas where the light receiving coverages on the pupil plane of the N pixels overlap with the light receiving coverages on the pupil plane of the AF pixels, the amount of light that depends on the intensity distribution of incident light can be integrated to obtain the amount of received light.

In the embodiment, a correction coefficient for each pixel position is determined based on changes in the amount of received light that depend on pixel positions of AF pixels and N pixels as illustrated in FIGS. 5 to 8, and the coefficient is used to correct a pixel value of various pixels.

Specifically, in the embodiment, the amount of received light of an L pixel and the amount of received light of an N pixel at a pixel position (x,y) are defined as IL(x,y) and IN(x,y) respectively. A received light amount correction coefficient α is determined based on the ratio of the amounts of received light. Pixel values of AF pixels and N pixels are then multiplied by the received light amount correction coefficient α to correct the pixel values used in the pupil split phase difference method.

The exit pupil of the taking lens is also dependent on the f-number of the taking lens. Further, the f-number is dependent on a zoom state or the position of the focusing lens. Therefore, the received light amount correction coefficient α may be varied depending on the f-number, the zoom state, or the position of the focusing lens. The f-number corresponds to the size of the exit pupil that depends on positions on a light receiving element and has the most significant effect on the amount of received light. For this reason, the received light amount correction coefficient α may be varied for each f-number, for example.

Figure 9:
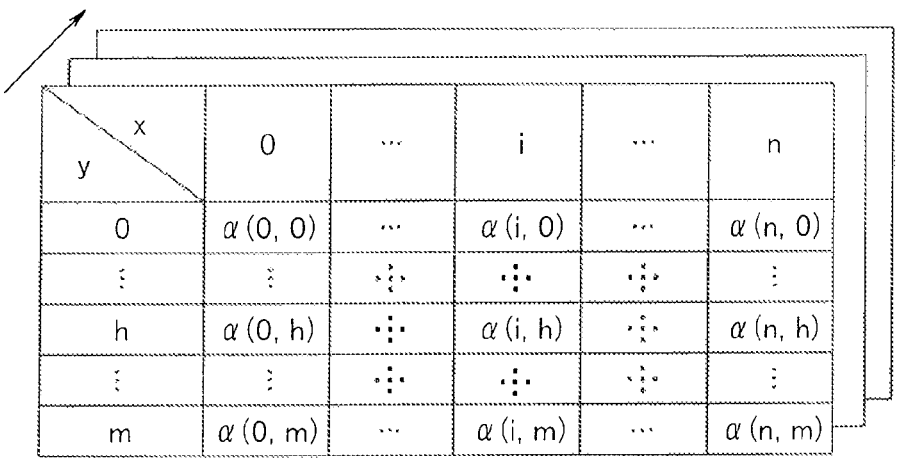
FIG. 9 is an explanatory diagram for illustrating a table stored in a received light amount correction memory 27.

FIG. 9 is an explanatory diagram for illustrating a table stored in a received light amount correction memory 27.

In the embodiment, the body control section 24 is adapted to cause the received light amount correction memory 27 to store the received light amount correction coefficient α determined through measurement. Specifically, an image of a reference object is picked up to determine the amount of received light at each pixel position of AF pixels and N pixels. According to the measurement result, the body control section 24 determines received light amount correction coefficient α for each pixel position and creates a table.

The received light amount correction memory 27 stores tables of received light amount correction coefficients α that depend on pixel positions (xy coordinates) for each f-number. Each table stores received light amount correction coefficients α(x,y) corresponding to addresses (x,y) of pixel positions of pixels to be corrected. The example in FIG. 9 shows that received light amount correction α corresponding to AF pixels or the like at n pixel positions in x direction and m pixel positions in y direction are stored.

Values in the table of received light amount correction coefficients α differ by f-number, and FIG. 9 shows only received light amount correction coefficients α for one f-number. The received light amount correction coefficients α may be set in association with substantially evenly spaced positions across the entire pixel area of the light receiving section, or may be set in association with appropriately spaced positions for each of AF areas defined in the entire pixel area of the light receiving section. The coefficients may also be set in association with pixel positions of different pixel intervals between the center and the periphery on the light receiving section.

In other words, the received light amount correction coefficients α may be set in association with all necessary pixel positions for focus detection, or one received light amount correction coefficient α may be set for each AF area. Alternatively, a received light amount correction coefficient α may be set for each pixel required for focus detection in a peripheral area, and only one received light amount correction coefficient α may be set for a central area.

A ratio of amounts of received light of an AF pixel and an N pixel may be used as the received light amount correction coefficient α. For example, in a case where an L pixel is used as the AF pixel, α(x,y)=IL(x,y)/IN(x,y), where the pixel value of the L pixel at address (x,y) is L(x,y), the pixel value of the N pixel at address (x+1,y+1) is N(x+1,y+1), and the pixel value of the virtual R pixel at address (x,y) is R(x,y). Further, R(x,y)R(x,y)=α(x,y) N(x+1,y+1) may be used.

Figure 10:
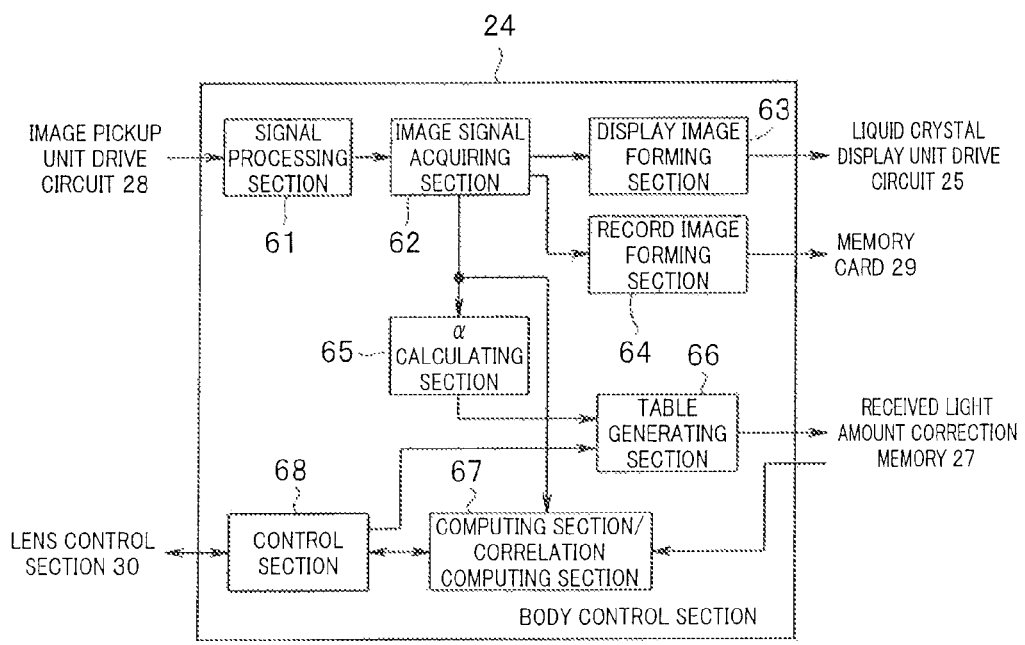
FIG. 10 is a block diagram illustrating a specific configuration of the body control section 24 in FIG. 1.

FIG. 10 is a block diagram illustrating a specific configuration of the body control section 24 in FIG. 1.

Image pickup signals from the image pickup unit drive circuit 28 are inputted to an image signal acquiring section 62 through a signal processing section 61. The image signal acquiring section 62 outputs signals that are based on normal pixels among the image pickup signals to a display image forming section 63. The display image forming section 63 generates an image to be displayed based on the inputted signals and outputs the image to the liquid crystal display unit drive circuit 25. The liquid crystal display unit drive circuit 25 causes the liquid crystal display unit 26 to display a picked-up image on a display screen. A record image forming section 64 is supplied with signals that are based on normal pixels from the image signal acquiring section 62, interpolates AF pixels and generates a record image. The record image is supplied to the memory card 29 for storage.

Meanwhile, the image signal acquiring section 62 outputs signals of AF pixels and N pixels for focus detection to an α calculating section 65. When an image of a predetermined reference object is picked up by the image pickup unit 22, the α calculating section 65 calculates a received light amount correction coefficient α for each pixel position based on information of both the amount of received light of the signals of AF pixels and N pixels for focus detection and the pixel positions, outputs the coefficient to a table generating section 66. The table generating section 66 also retains f-number information inputted through a control section 68 as described later. The table generating section 66 generates a table of received light amount correction coefficients α as shown in FIG. 9. The table is provided to the received light amount correction memory 27 for storage.

In use, the control section 68 reads the f-number information from the lens control section 30 in the interchangeable lens 12 and provides the information to a computing section/correlation computing section 67. The computing section/correlation computing section 67 is supplied with signals of AF pixels and N pixels for focus detection from the image signal acquiring section 62. The computing section/correlation computing section 67 selects a table stored in the received light amount correction memory 27 based on the f-number information, and reads received light amount correction coefficients α corresponding to positions of AF pixels and N pixels from the selected table to correct pixel values of the AF pixels and the N pixels.

The computing section/correlation computing section 67 uses the corrected pixel values of the AF pixels and the N pixels to calculate a defocus amount through the computation of the pupil split phase difference method. The computing section/correlation computing section 67 outputs an AF signal based on the calculated defocus amount to the control section 68. The control section 68 provides the AF signal to the lens control section 30.

Figure 11:
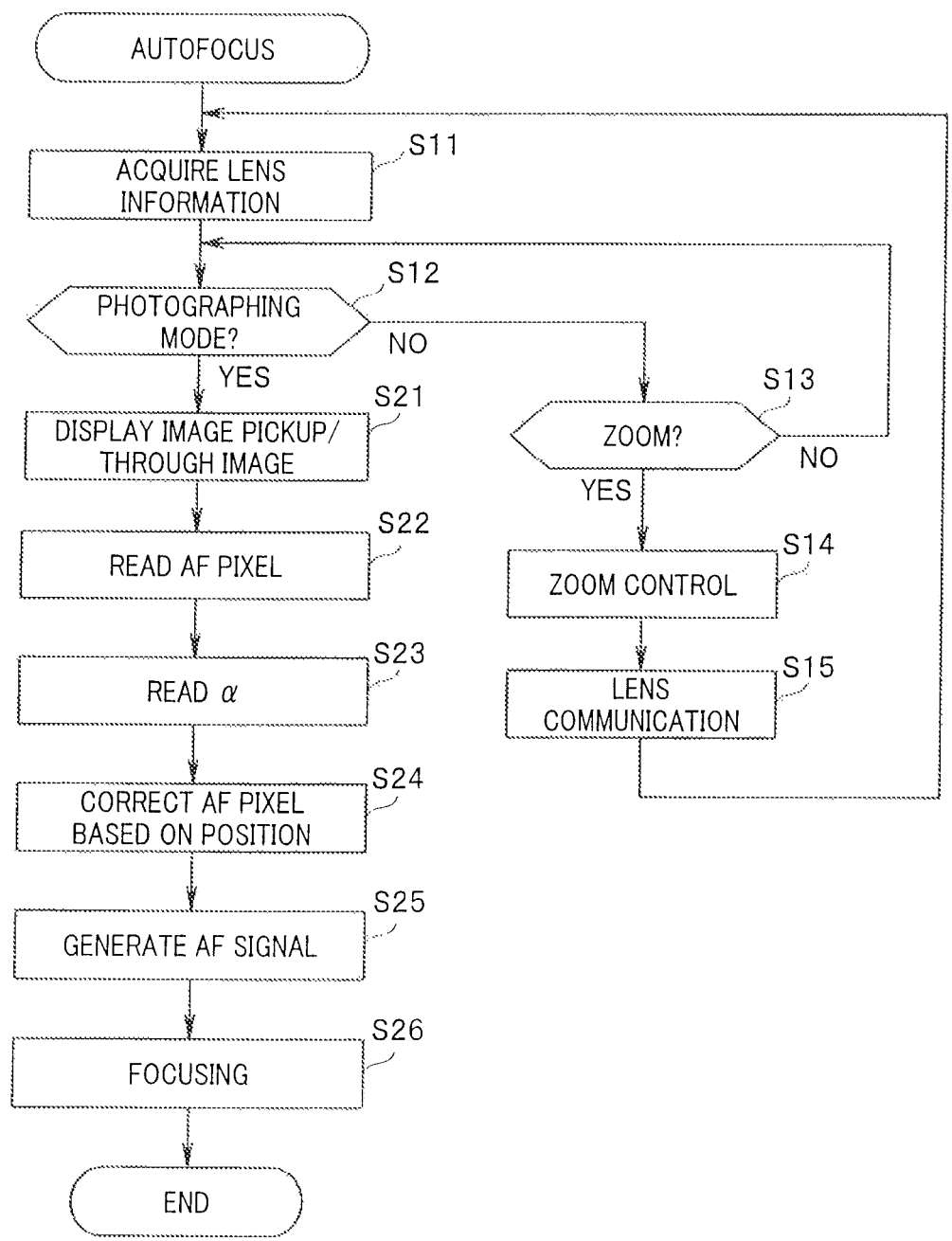
FIG. 11 is a flow chart for illustrating operation of the first embodiment.

The operation of the embodiment thus configured will now be described with reference to a flow chart in FIG. 11. FIG. 11 illustrates an autofocus control.

When the image pickup apparatus 11 is powered up or an interchangeable lens is replaced with another, the body control section 24 reads, in step S11, lens-side correction information stored in the received light amount correction memory 17 via the lens control section 30 in the interchangeable lens 12.

The body control section 24 judges whether or not a photographing mode is indicated. If the photographing mode is not indicated, the body control section 24 judges whether or not a zoom operation is performed (step S13). If the zoom operation is performed, the lens control section 30 controls the lens drive section 16 for zooming. The lens control section 30 transmits information on zooming, information on f-numbers and the like to the body control section 24 as the lens-side correction information (step S15). In this way, the body control section 24 obtains the updated lens-side correction information (step S11).

If the photographing mode is indicated, the body control section 24 causes, in step S21, the liquid crystal display unit 26 to display a picked-up image (through image) in live view based on image signals from the image pickup unit 22.

In the next step, S22, the body control section 24 reads pixel values of AF pixels and N pixels for focus detection from the image pickup unit 22. The body control section 24 also reads received a light amount correction coefficient α that depends on a pixel position for each pixel from the received light amount correction memory 27 (step S23), and corrects the pixel values of the AF pixels and the N pixels by using the received light amount correction coefficients α (step S24).

The body control section 24 uses the corrected AF pixels and N pixels to calculate a defocus amount and generates an AF signal for focusing (step S25). The AF signal is supplied to the lens control section 30, which accomplishes focusing.

As described above, in the embodiment, received light amount correction coefficients α that depend on pixel positions are used to correct at least one of pixel values of AF pixels and pixel values of N pixels for focus detection. Because of differences in eclipses of exit pupils, eccentricity of on-chip lenses, intensity distribution of incident light on AF pixels on the pupil plane depending on positions on the light receiving section, the amounts of received light of AF pixels and N pixels vary depending on pixel positions. The received light amount correction coefficient α is intended for correcting such changes, and a table storing received light amount correction coefficients α can be used to correct pixel values of AF pixels and N pixels and highly accurate focus control can be achieved.

In the above embodiment, description has been made to examples where f-numbers or the like is variable. However, the received light amount correction memory 17 may be omitted in the case of using a stationary lens in which f-number or the like is fixed.

In the above embodiment, description has been made to examples where received light amount correction coefficients are calculated based on the amount of received light measured by picking up an image of an reference object and the coefficients are stored in the received light amount correction memory. If received light amount correction coefficients α are determined from a known camera structure, however, the calculating section for the received light amount correction coefficients α is not needed and a received light amount correction memory for storing the known received light amount correction coefficients α only needs to be provided.

Second Embodiment

Figure 14:
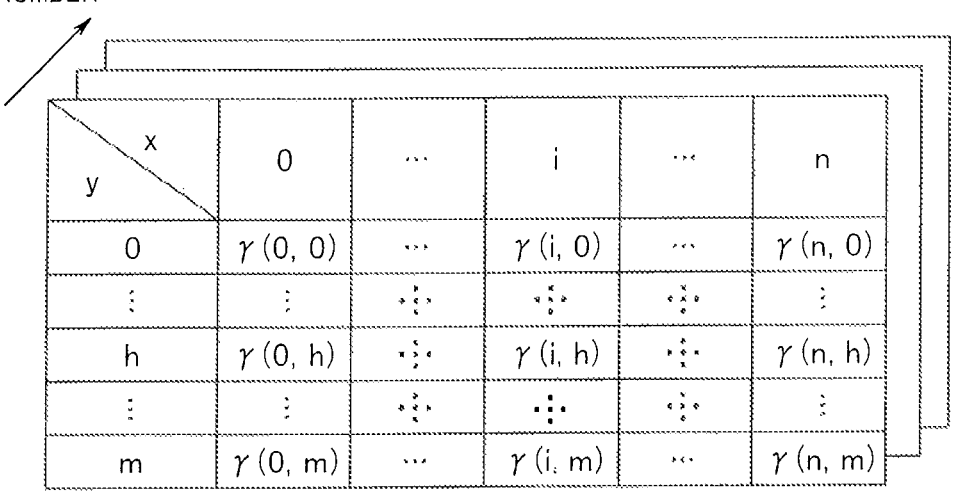
FIG. 14 is an explanatory diagram for illustrating information stored in a received light amount correction memory 27.

FIG. 12 is a block diagram illustrating an example of a specific configuration of a body control section used in a second embodiment. In FIG. 12, the same components as those in FIG. 10 are shown with like reference characters and description thereof will be omitted. FIGS. 13 and 14 are explanatory diagrams for illustrating information stored in received light amount correction memories 17 and 27, respectively.

In the first embodiment, a received light amount correction coefficient α is determined by using a measurement value in the body control section 24, and a table is created and stored in the received light amount correction memory 27. In contrast, the embodiment is different from the first embodiment in that a body control section 71 is used to determine a received light amount correction coefficient α through computation.

In the embodiment, the received light amount correction memory 17 in the interchangeable lens 12 stores, as lens-side correction information β(x,y), exit pupil information corresponding to items 51, 52y, 52x, and 52xy in FIGS. 5 to 8, namely information of eclipses. As shown in FIG. 13, the lens-side correction information β(x,y) is provided in association with a pixel position for each f-number. While the example shows the case where lens-side correction information β is provided for each f-number, the lens-side correction information β may be provided depending on a zoom state or a focusing state.

On the other hand, the received light amount correction memory 27 in the camera body 13 stores body-side correction information generated based on both information on intensity distribution of incident light on AF pixels and information on a light receiving coverage of the AF pixels depending on on-chip eccentricity. As shown in FIG. 14, body-side correction information γ(x,y) is provided in association with pixel positions for each f-number. The body-side correction information γ may also be provided on a zoom or focusing state basis depending on the lens-side correction information β.

The body control section 71, for example, selects a table in received light amount correction memory 17 based on f-number, and reads the lens-side correction information β in the selected table through the lens control section 30. The body control section 71 also selects a table in received light amount correction memory 27 based on f-number, and reads the body-side correction information γ in the selected table.

The body control section 71 includes an α calculating section 72a. The α calculating section 72a performs computation with the lens-side correction information β and the body-side correction information y to determine a received light amount correction coefficient α. In a case where a correction coefficient is defined based on asymmetry as the body-side correction information γ, for example, the α calculating section 72a can multiply the lens-side correction information β corresponding to a pixel position by a correction coefficient based on the asymmetry to determine a received light amount correction coefficient α.

In a case where information on intensity distribution of incident light on AF pixels and information of a light receiving coverage of the AF pixels depending on on-chip eccentricity are stored as the body-side correction information γ, the α calculating section 72a may perform integration by using those pieces of information and information on the shape of the exit pupil to determine a received light amount correction coefficient α.

The body control section 71 uses the received light amount correction coefficients α calculated by the a calculating section 72a to correct pixel values of AF pixels and N pixels at every pixel position, and uses the corrected pixel values to achieve focus detection.

Figure 15:
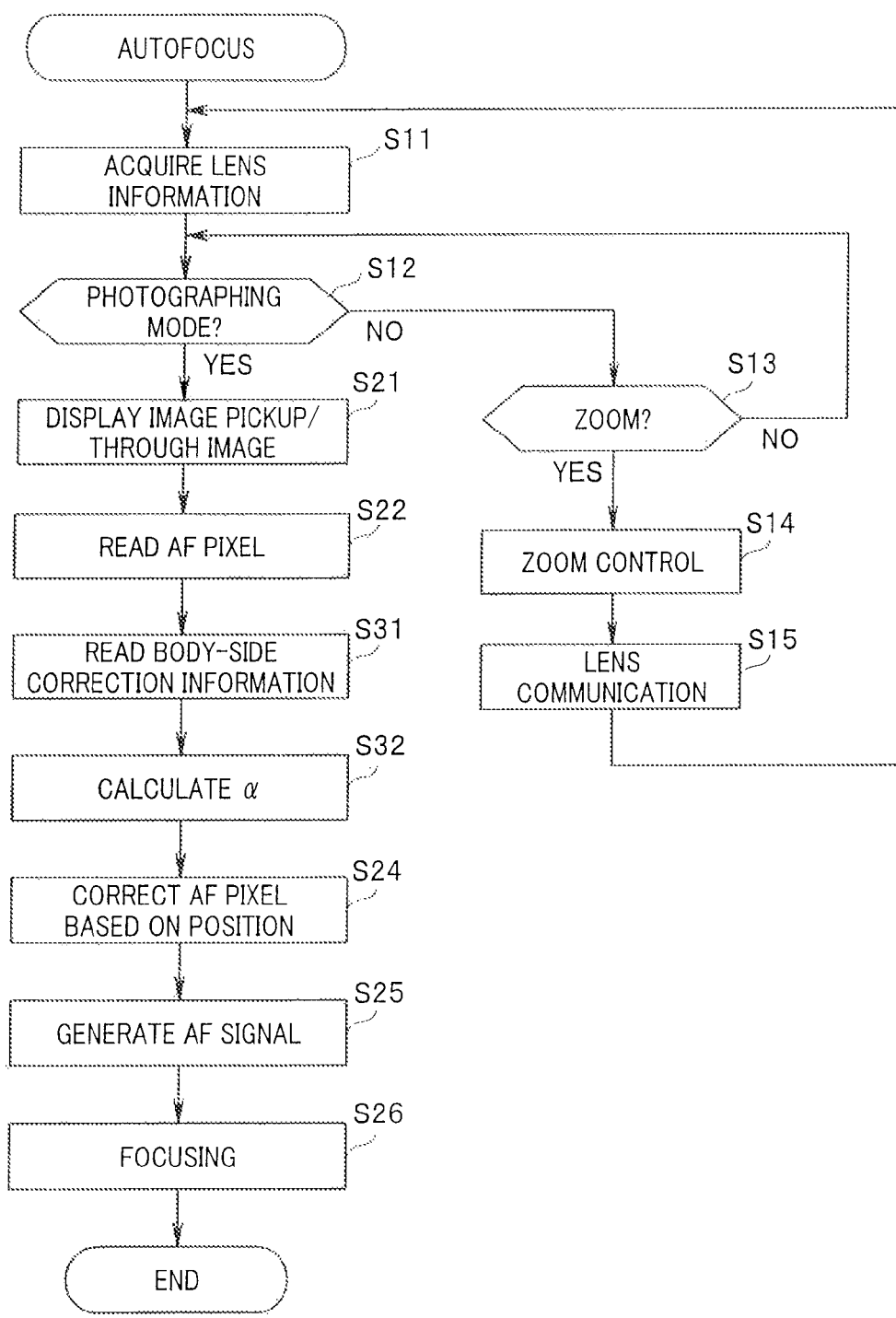
FIG. 15 is a flow chart for illustrating operation of the second embodiment.

The operation of the embodiment thus configured will now be described with reference to a flow chart in FIG. 15. In FIG. 15, the same steps as those in FIG. 11 are shown with like reference characters and description thereof will be omitted.

The flow in FIG. 15 is different from the flow in FIG. 11 in that the process of reading α in step S23 in FIG. 11 is replaced with the processes of reading body-side correction information in step S31 and calculating a in step S32.

The body control section 71 reads the lens-side correction information in the process of acquiring lens information in step S11. The body control section 71 also reads the body-side correction information in step S31. In step S32, an α calculating section 71a in the body control section 71 calculates a received light amount correction coefficient α by using the lens-side correction information and the body-side correction information.

Other operations are similar to those in the first embodiment.

In this way, similar effects to those in the first embodiment can be attained in the embodiment. In the embodiment, lens-side correction information and body-side correction information are stored in received light amount correction memories provided on the lens side and the body side, respectively, and a received light amount correction coefficient α is determined based on the information, which is advantageous in that the need of determining the received light amount correction coefficient α in advance is eliminated.

In the above embodiment, description has been made to examples where a received light amount correction coefficient α is determined depending on a pixel position. However, even in the case of an on-axis pixel, the amount of received light varies as f-number varies, for example. For this reason, a received light amount correction coefficient α may be defined for each f-number and the pixel value of the on-axis pixel may be corrected by using a table of the received light amount correction coefficients α.

The table of this case is also stored in the received light amount correction memory on the body side. The value of the received light amount correction coefficient α can also be calculated from, for example, a pixel value of an L pixel and a pixel value of an N pixel when a white uniform diffuser surface is photographed. In this case, the received light amount correction coefficient α can also be calculated from lens data and data of image pickup device. The received light amount correction coefficient α corresponding not only to the f-number but also to a zoom state or a focusing lens position may be defined.

Note that the embodiments described above can be applied to the case where only AF pixels are used for focus detection, and the approaches described above can be used to correct pixel values of the AF pixels depending on pixel positions to achieve highly accurate focus control.

Third Embodiment

Figure 16:
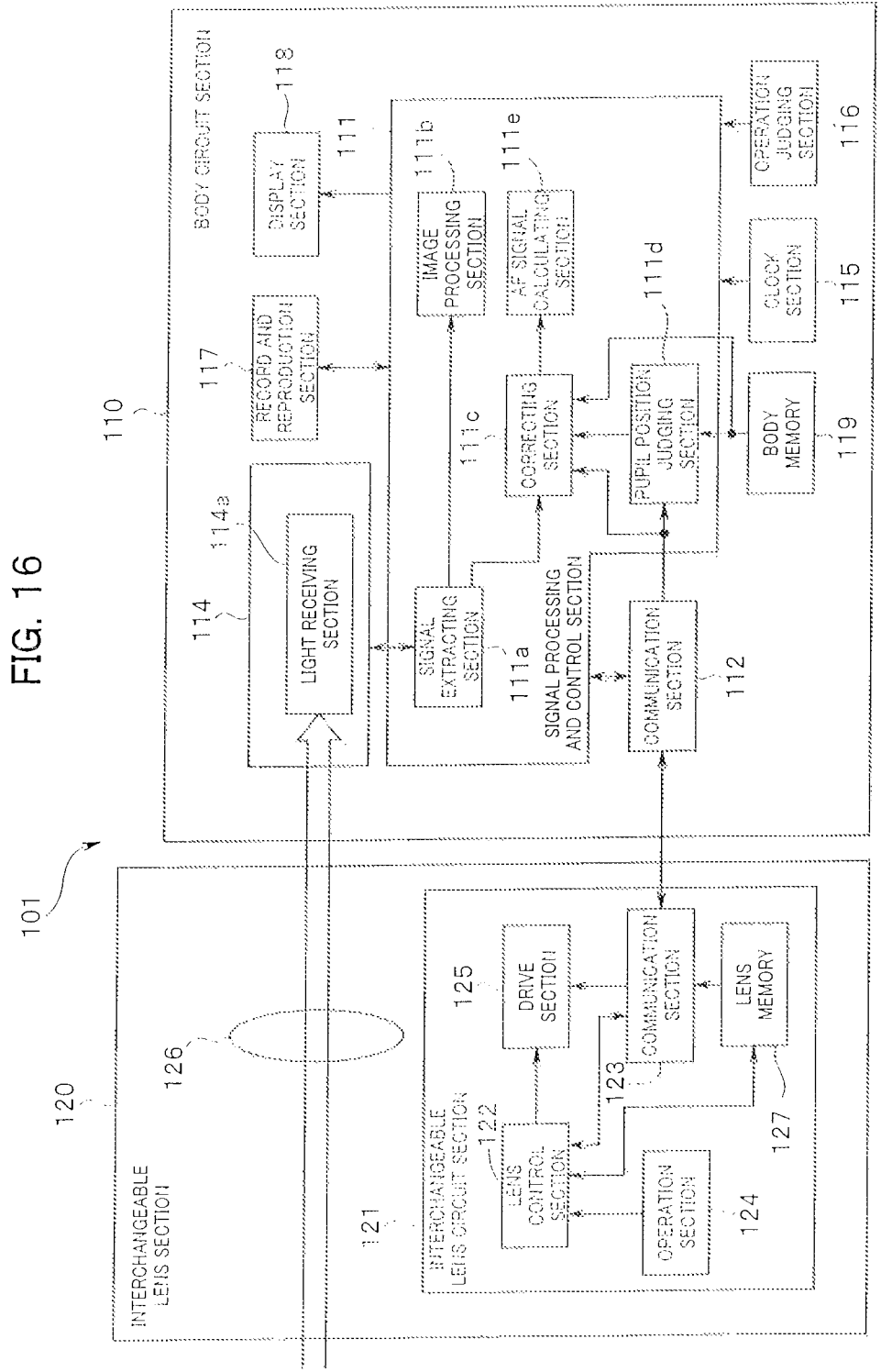
FIG. 16 is a block diagram illustrating an image pickup apparatus according to a third embodiment of the invention.

FIG. 16 is a block diagram illustrating an image pickup apparatus according to a third embodiment of the invention.

Figure 17:
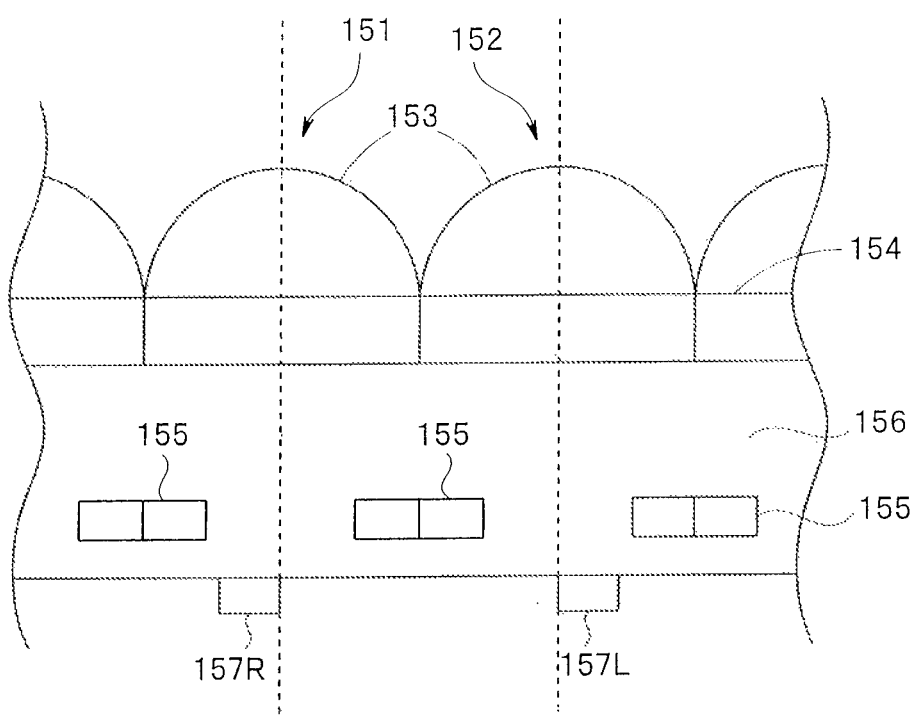
FIG. 17 is an explanatory diagram illustrating a configuration of a pixel located close to an optical axis of taking lens among pixels constituting an image pickup device.

First, with reference to FIGS. 17 to 26, description will be made to an image pickup device and a method for correcting an image signal adopted in the embodiment. FIG. 17 is an explanatory diagram illustrating a configuration of a pixel located close to an optical axis of taking lens among pixels constituting an image pickup device.

The taking lens of an image pickup apparatus forms an optical image entering the image pickup apparatus from an object through each of optical paths onto a light receiving plane of the image pickup device. As described above, a pupil split phase difference method can be used to achieve autofocusing.

FIG. 17 illustrates an example where pixels 151 and 152 are R and L pixels, respectively. Each pixel, including the pixels 151 and 152, is provided with a microlens 153, color filter 154, a light shielding film 155 for preventing colors of color pixels from being mixed, a smoothing layer 156 for providing a planar surface on which color filter layers are disposed, and a photoelectric conversion area 49 (hereinafter referred to as "light receiving area") in this order from the top. The pixel 151 is an R pixel and a light receiving area 157R constitutes an R image pickup unit. The pixel 152 is an L pixel and a light receiving area 157L constitutes an L image pickup unit.

Dashed lines in FIG. 17 represent optical axes for respective microlenses 153. An end of each of the light receiving areas 157R and 157L, which constitute the R image pickup unit and the L image pickup unit, coincide with the optical axis of the microlens 153 as shown in FIG. 17.

Since the pixels 151 and 152 are close to the optical axis of taking lens, the optical axes of the pixels 151 and 152 are substantially parallel to the optical axis of taking lens (not shown) and the optical axis of the microlens 153 and the optical axis of taking lens substantially coincide with each other. The light receiving area 157R therefore receives a right part of a luminous flux passing through the exit pupil and evenly split into right and left, and the light receiving area 157L receives a left part of a luminous flux passing through the exit pupil and evenly split into right and left. This means that the luminous flux passing through the exit pupil is evenly split into right and left and enters the light receiving areas 157R and 157L.

In the case where a pixel is displaced from the vicinity of the optical axis of taking lens, however, a principal ray is not parallel to the optical axis of the microlens 153. In this case, in order to evenly split a luminous flux passing through the exit pupil and direct them to the L image pickup unit and the R image pickup unit, one end of the light receiving area, which constitutes each of the L and R image pickup units, needs to be located on an axis passing both the vertex of the microlens 153 and the center of the exit pupil.

Figure 18:
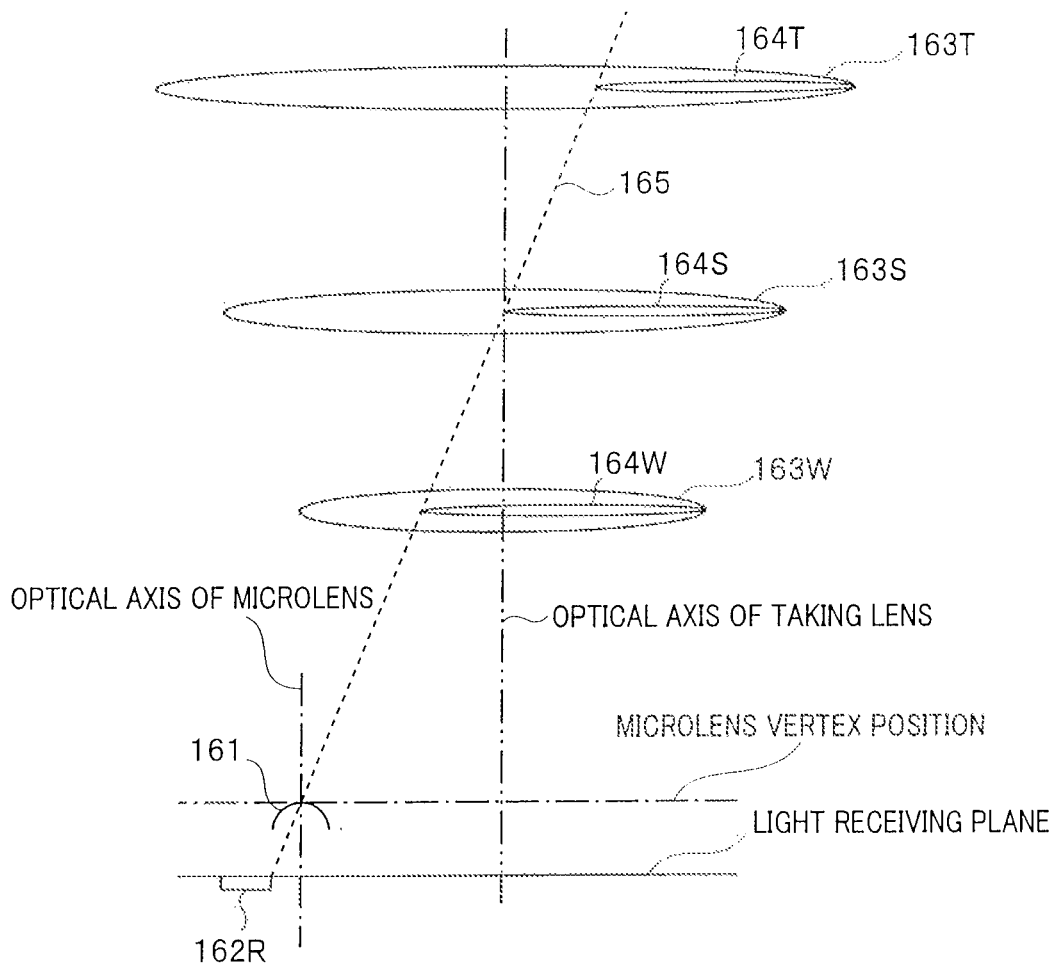
FIG. 18 is an explanatory diagram illustrating a relationship among a light receiving area, a microlens, and an exit pupil.
Figure 19A:
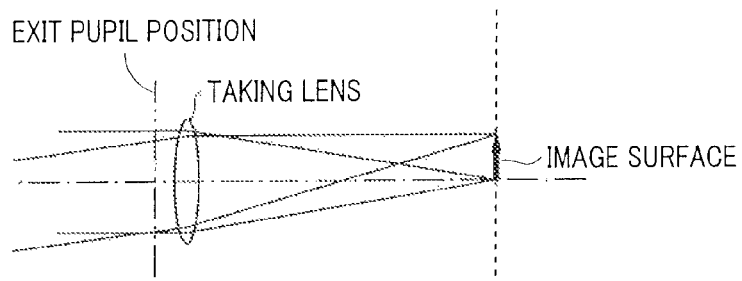
FIGS. 19A to 19C are explanatory diagrams illustrating a relationship between a focal length and the position of an exit pupil.
Figure 19B:
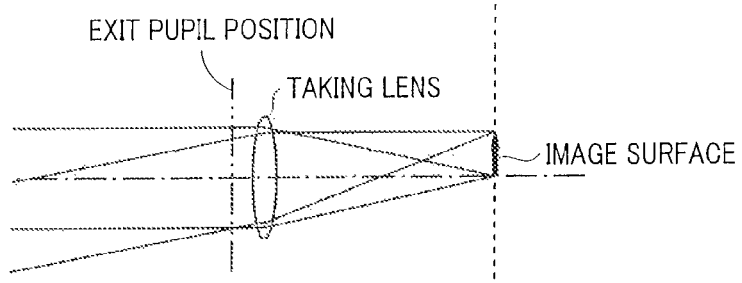
Figure 19C:
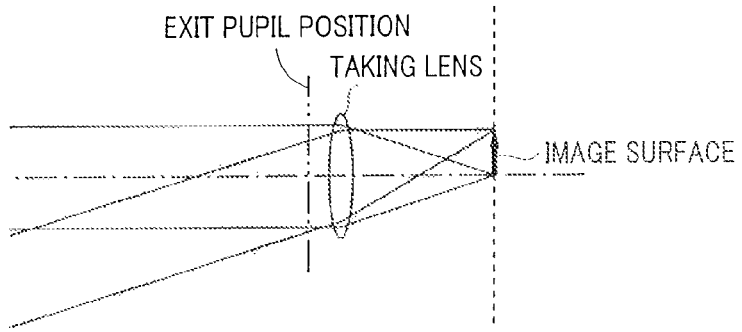

FIG. 18 is an explanatory diagram illustrating a relationship among a light receiving area, a microlens, and an exit pupil. In addition, FIGS. 19A to 19C are explanatory diagrams illustrating a relationship between a focal length and the position of an exit pupil.

FIG. 18 shows a microlens 161 that constitutes one of pixels except pixels located close to the optical axis of taking lens, and a light receiving area 162R, which forms the R image pickup unit. FIG. 18 shows exit pupils 163T, 163S, and 163W at three positions corresponding to changes in the position of the taking lens (hereinafter referred representatively to as "exit pupil 163") FIGS. 19A to 19C illustrate a luminous flux from an object forming an image surface through an taking lens: FIG. 19A shows an example where the taking lens is in a tele end (on the side of the object), FIG. 19B shows an example where the taking lens is at a reference position, and FIG. 19C shows an example where the taking lens is in a wide end (on the side of the image). As shown in FIGS. 19A to 19C, the longer the focal length is, generally the longer the distance from the image surface to the exit pupil position is.

As shown in FIG. 18, the light receiving area 162R is configured such that one end of the light receiving area 162R is aligned with a position where a principal ray 165 passing both the center of the exit pupil 163S at the reference position and the vertex of the microlens 161 intersects with the light receiving plane. This means that the light receiving area 162R is eccentric relative to the optical axis of the microlens 161 by a predetermined eccentricity depending on the inclination of the principal ray 165. The eccentricity depends on pixel positions and increases as the image height increases.

Of the luminous flux from the object passing through the exit pupil 163S, a luminous flux 164S that corresponds to a right half of the exit pupil 163S enters the light receiving area 162R that constitutes the R image pickup unit. As described above, each of the light receiving areas which constitutes the L and R image pickup units can be arranged eccentrically up to a position where the principal ray 165 passing both the center of the exit pupil 163S and the vertex of the microlens 161 intersects with the light receiving plane to evenly split a luminous flux passing through the exit pupil into left and right and direct them to the L image pickup unit and the R image pickup unit.

As shown in FIG. 18, as for the exit pupil 163W in the case where the taking lens is moved to the wide end (on the side of the image), however, a luminous flux 164W that is larger than the half of the luminous flux passing through the exit pupil 163W enters the light receiving area 162R that constitutes the R image pickup unit. As for the exit pupil 163T in the case where the taking lens is moved to the tele end (on the side of the object), a luminous flux 164T that is smaller than the half of the luminous flux passing through the exit pupil 163T enters the light receiving area 162R.

This means that when the position of the light receiving area 162R is determined depending on the principal ray 165 passing through the center of the exit pupil 163S, luminous fluxes entering the L image pickup unit and the R image pickup unit are not even when the exit pupil 163 is located away from the exit pupil 163S. Consequently, AF accuracy is significantly degraded when the exit pupil 163 is located away from the reference position.

In the embodiment, therefore, eccentricity of a light receiving area of an AF pixel is set depending on exit pupil positions. Specifically, even with a plurality of AF pixels that have substantially the same inclination of principal rays passing both the center of the exit pupil at a reference exit pupil position and the vertex of the microlens, plural types of eccentricity are defined depending on the inclination of the principal rays that varies depending on the exit pupil positions.

For example, assuming three exit pupil positions: a tele end position, a reference position, and a wide end position, the following three types of pixels are formed on an image pickup device: a pixel, the light receiving area of which is configured with an eccentricity defined in accordance with the inclination of the principal ray when the exit pupil position is at the tele end; a pixel, the light receiving area of which is configured with an eccentricity defined in accordance with the inclination of a principal ray when the exit pupil position is at the reference position; and a pixel, the light receiving area of which is configured with an eccentricity defined in accordance with the inclination of the principal ray when the exit pupil position is at the wide end.

Figure 20:
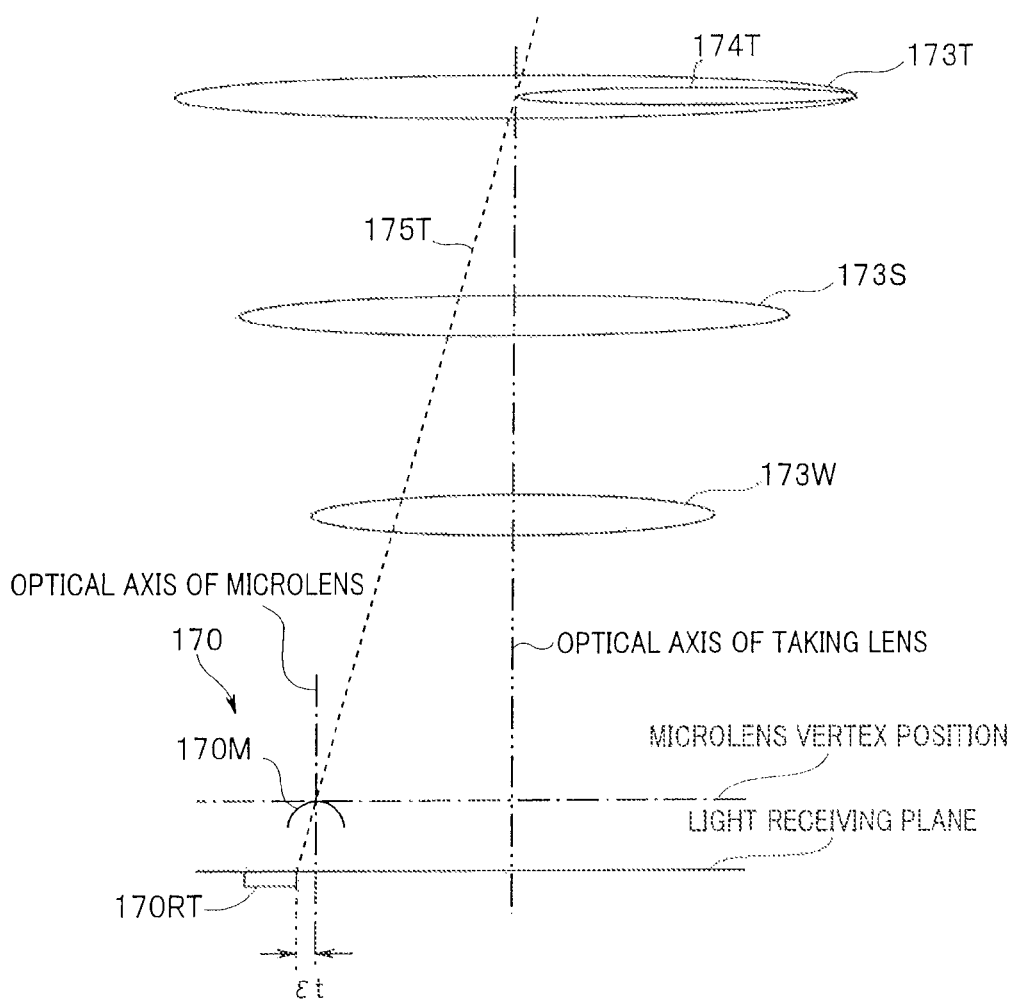
FIG. 20 is an explanatory diagram for illustrating an eccentricity that depends on an exit pupil position.
Figure 21:
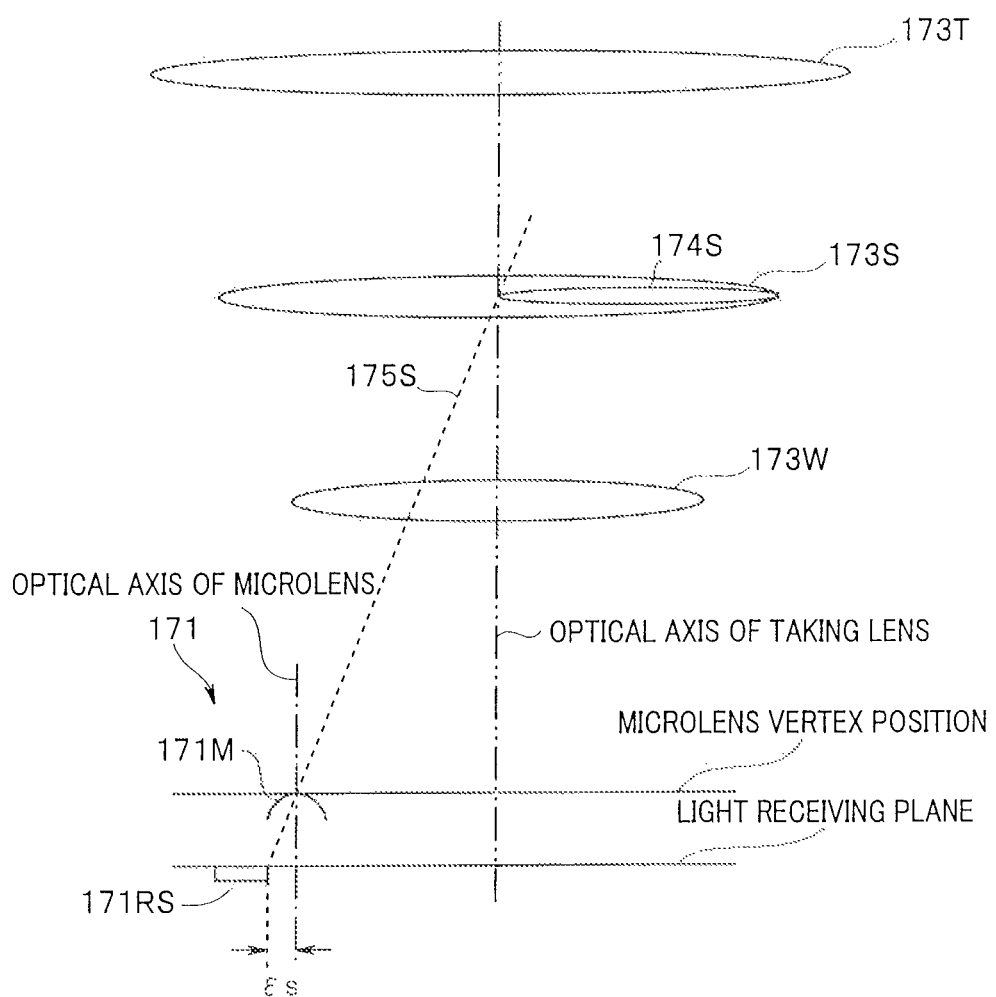
FIG. 21 is an explanatory diagram for illustrating an eccentricity that depends on an exit pupil position.
Figure 22:
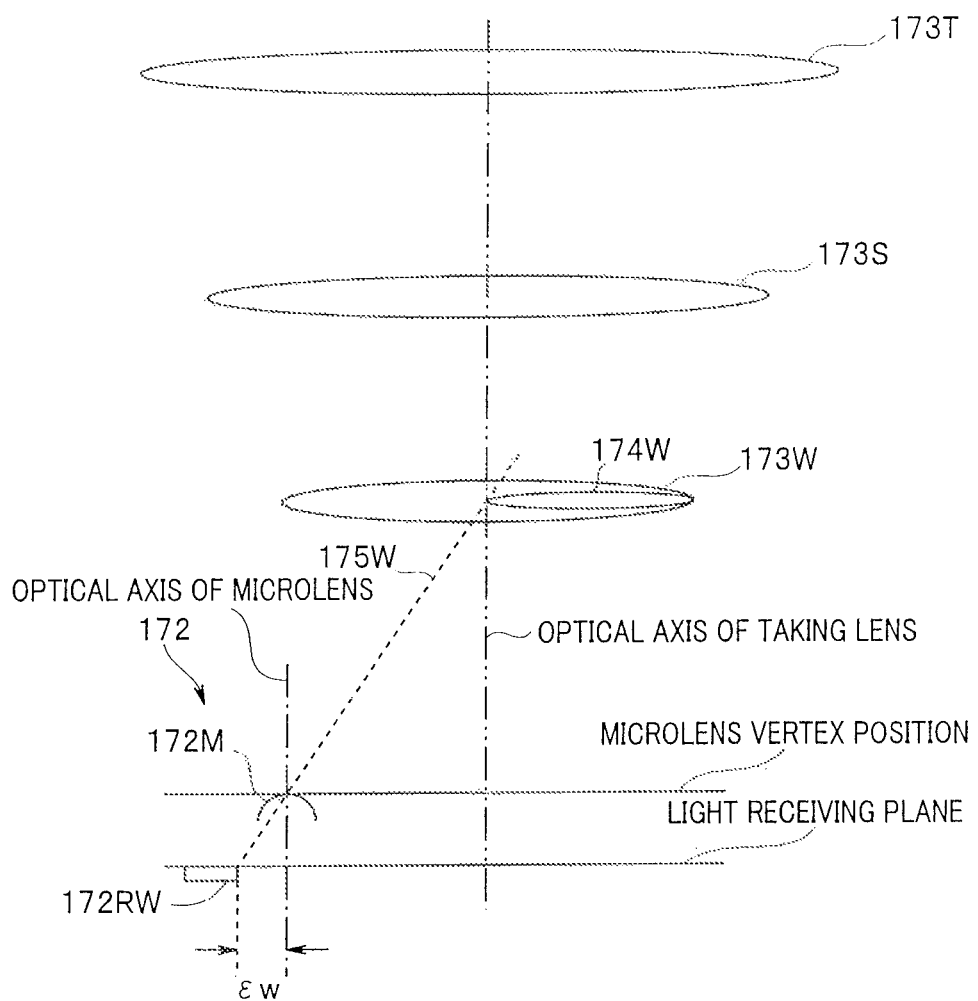
FIG. 22 is an explanatory diagram for illustrating an eccentricity that depends on an exit pupil position.

FIGS. 20 to 22 are explanatory diagrams for illustrating an eccentricity that depends on an exit pupil position. FIGS. 20 to 22 show three pixels that have substantially the same inclination of principal rays passing both the center of an exit pupil 173S at the reference exit pupil position and the vertex of the microlenses 170M to 173M, namely three pixels at substantially the same horizontal direction on the image pickup device.

FIG. 20 shows a pixel 170, the light receiving area of which is configured with an eccentricity defined in accordance with the inclination of the principal ray 175T when the exit pupil position is at the tele end. The pixel 170 includes a microlens 170M and a light receiving area 170RT that constitutes the R image pickup unit. The light receiving area 170RT is formed such that an end of the light receiving area 170RT is located at a position where a principal ray 175T passing both the center of the exit pupil 173T and the vertex of the microlens 170M intersects with the light receiving plane. The eccentricity between the optical axis of the microlens 170M and the end of the light receiving area 170RT is ϵt.

At the pixel 170, when the exit pupil position is at the position of the exit pupil 173T, a luminous flux 174T that corresponds to a right half of the luminous flux passing through the exit pupil 173T enters the light receiving area 170RT. Therefore, the pixel 170 can be a pixel in which sufficient AF accuracy can be achieved when the exit pupil position is at the exit pupil position 173T on the tele end.

FIG. 21 shows a pixel 171, the light receiving area of which is configured with an eccentricity defined in accordance with the inclination of the principal ray 175S when the exit pupil position is at the reference position. The pixel 171 includes a microlens 171M and a light receiving area 171RS that constitutes the R image pickup unit. The light receiving area 171RS is formed such that an end of the light receiving area 171RS is located at a position where a principal ray 175S passing both the center of the exit pupil 173S and the vertex of the microlens 171M intersects with the light receiving plane. The eccentricity between the optical axis of the microlens 171M and the end of the light receiving area 171RS is ϵs.

At the pixel 171, when the exit pupil position is at the position of the exit pupil 173S, a luminous flux 174S that corresponds to a right half of the luminous flux passing through the exit pupil 173S enters the light receiving area 171RS. Therefore, the pixel 171 can be a pixel in which sufficient AF accuracy can be achieved when the exit pupil position is at the exit pupil position 173S, or the reference position.

FIG. 22 shows a pixel 172, the light receiving area of which is configured with an eccentricity defined in accordance with the inclination of the principal ray 175W when the exit pupil position is at the wide end. The pixel 172 includes a microlens 172M and a light receiving area 172RW that constitutes the R image pickup unit. The light receiving area 172RW is formed such that an end of the light receiving area 172RW is located at a position where a principal ray 175W passing both the center of the exit pupil 173W and the vertex of the microlens 172M intersects with the light receiving plane. The eccentricity between the optical axis of the microlens 172M and the end of the light receiving area 172RW is ϵw.

At the pixel 172, when the exit pupil position is at the position of the exit pupil 173W, a luminous flux 174W that corresponds to a right half of the luminous flux passing through the exit pupil 173W enters the light receiving area 172RW Therefore, the pixel 172 can be a pixel in which sufficient AF accuracy can be achieved when the exit pupil position is at the exit pupil position 173W on the wide end.

Figure 23:
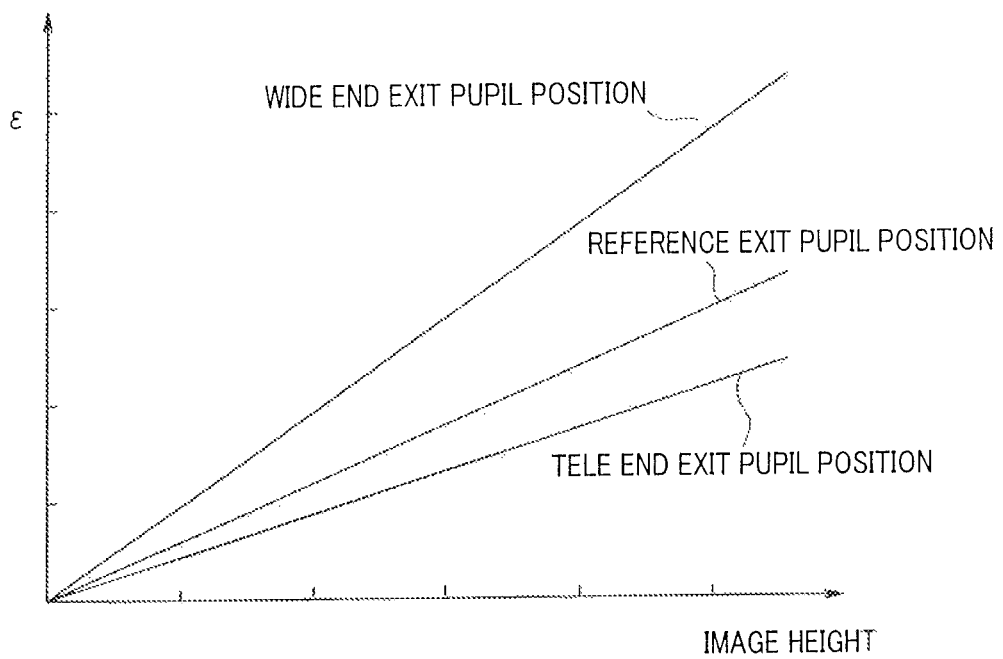
FIG. 23 is a graph illustrating changes in eccentricity that depends on image heights and exit pupil positions, where an axis of abscissas represents image heights and an axis of ordinates represents eccentricities $\epsilon$.

FIG. 23 is a graph illustrating changes in eccentricity that depends on image heights and exit pupil positions, where an axis of abscissas represents image heights and an axis of ordinates represents eccentricities ϵ. As shown in FIG. 23, the eccentricity increases as the image height increases. In the embodiment, the eccentricity varies depending on exit pupil positions, and therefore different pixels of three types of eccentricity are formed even for the same image height. In FIGS. 20 to 23, description has been made to examples of three exit pupil positions. However, two or four or more exit pupil positions may be assumed and pixels may be configured with different eccentricity for each exit pupil position.

Meanwhile, when a taking lens has a plurality of fixed exit pupil positions, sufficient AF accuracy can be achieved by forming pixels, the light receiving area of which is configured with eccentricity corresponding to each of the exit pupil positions. If exit pupil positions are not fixed, however, an actual exit pupil position and an exit pupil position assumed for determining eccentricity (hereinafter referred to as "design pupil position") may be inconsistent. In the embodiment, therefore, when an actual exit pupil position deviates from a design pupil position, image signals acquired from AF pixels are corrected depending on the deviation.

Figure 24:
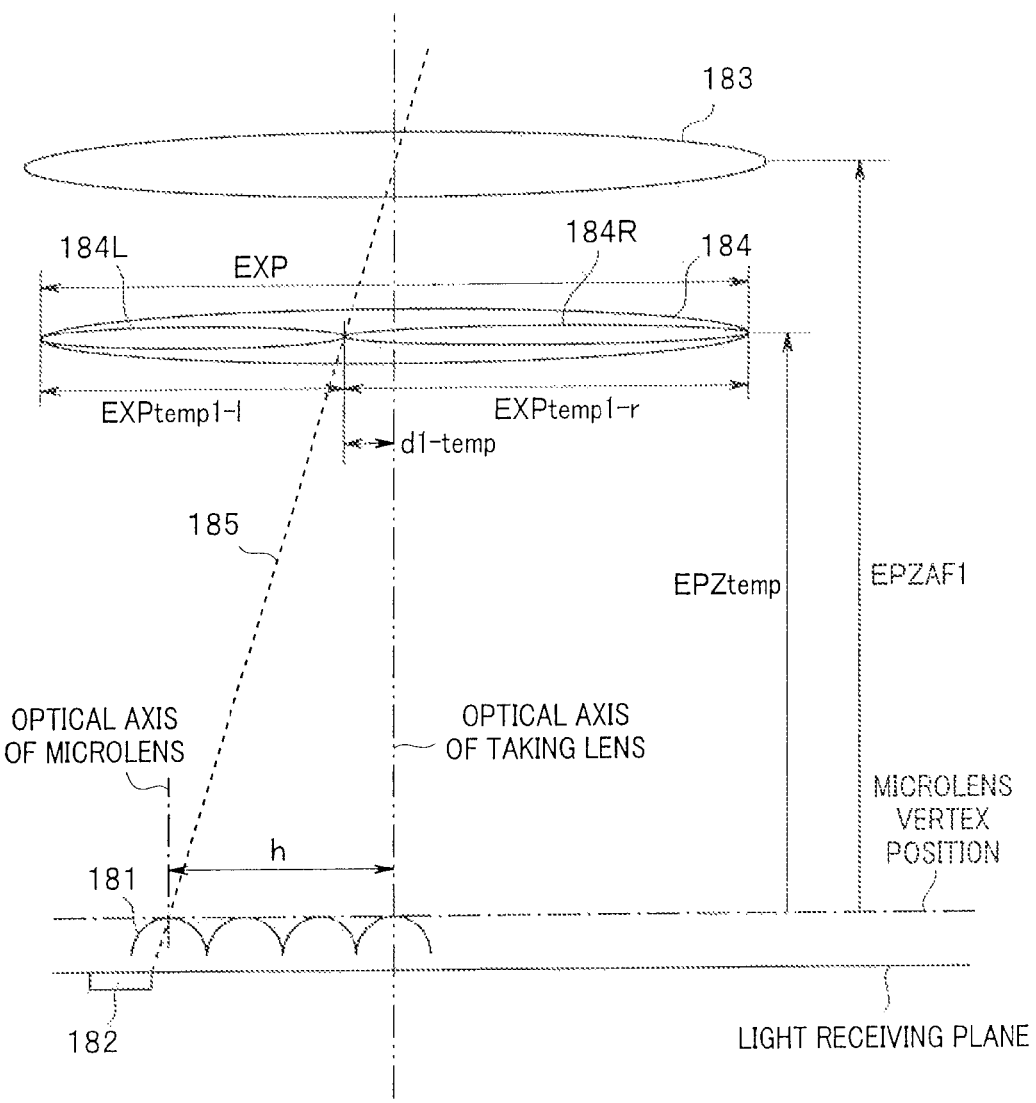
FIG. 24 is an explanatory diagram for illustrating a method for correcting an image signal.
Figure 25:
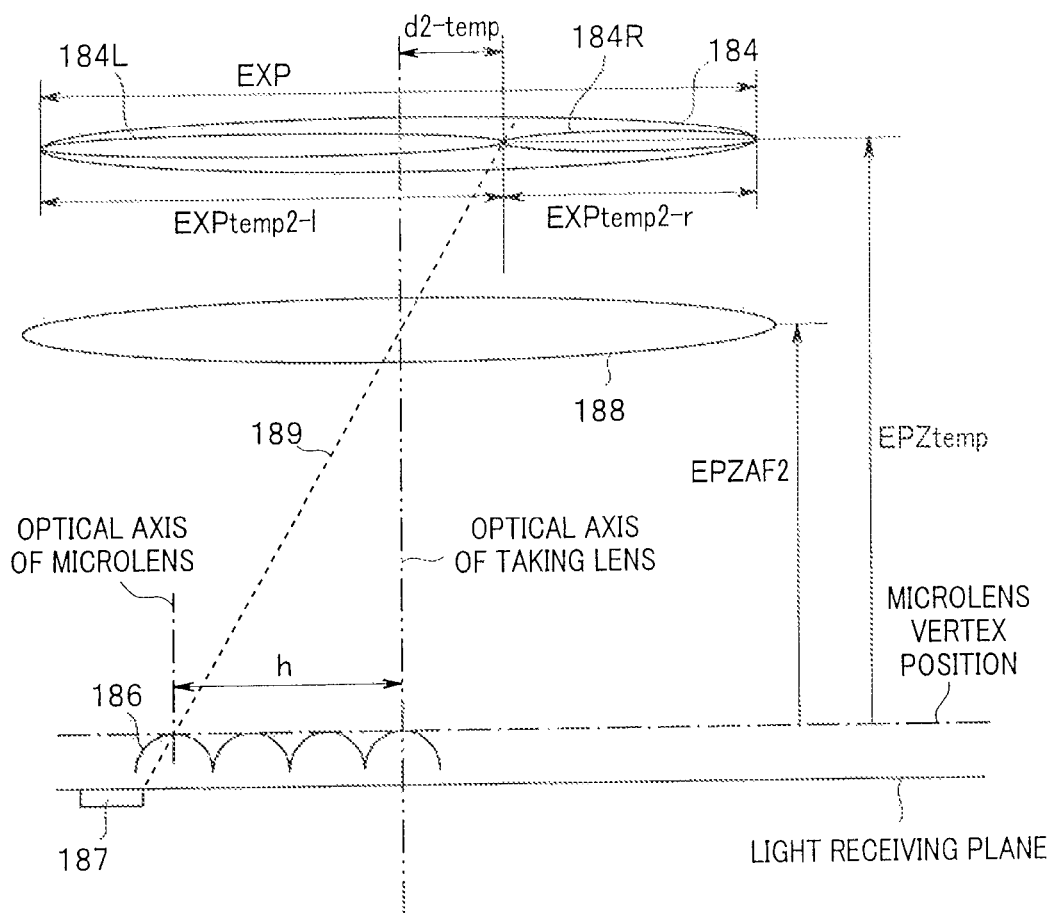
FIG. 25 is an explanatory diagram for illustrating a method for correcting an image signal.
Figure 26:
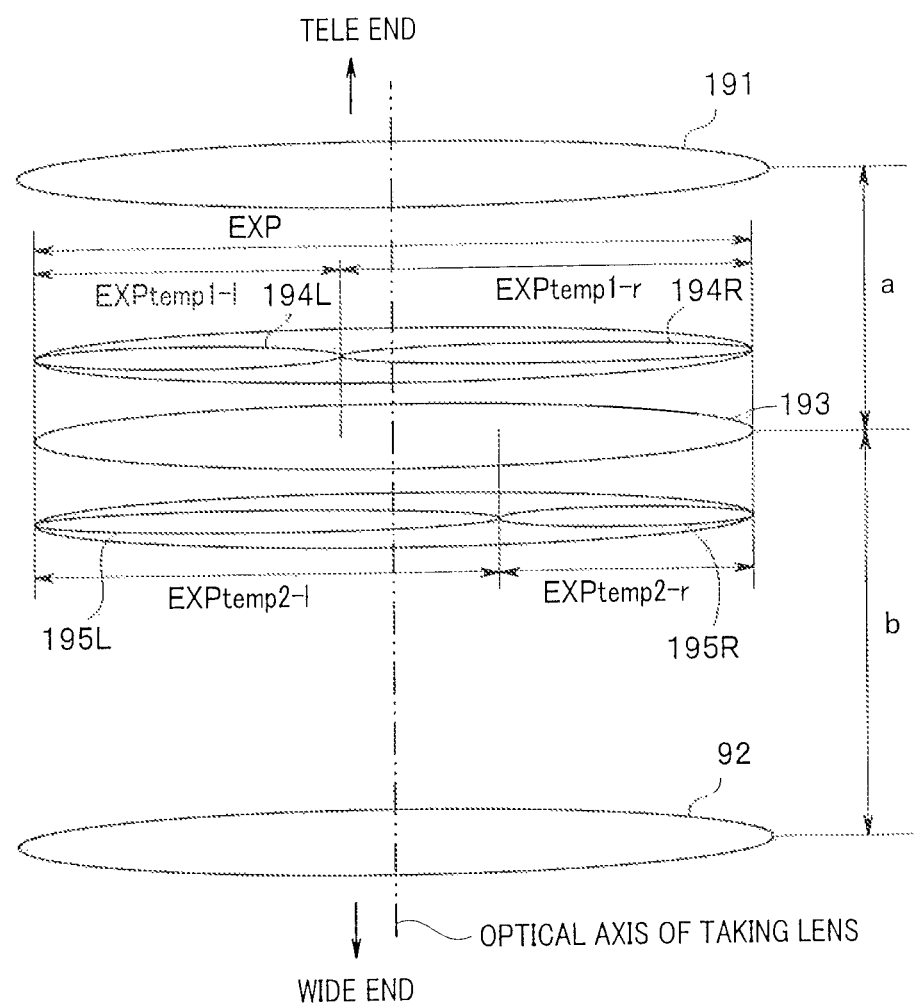
FIG. 26 is an explanatory diagram for illustrating a method for correcting an image signal.

FIGS. 24 to 26 are explanatory diagrams for illustrating a method for correcting such an image signal. As described above, the distance from an optical axis of microlens of each AF pixel to the end of the L or R image pickup unit (eccentricity $\epsilon$) increases as the image height increases. In FIGS. 24 to 26, the distance from an optical axis of taking lens is assumed as an image height h.

FIG. 24 shows an example where an actual exit pupil position is at a wide end with respect to a design pupil position. In a pixel composed of a microlens 181 and a light receiving area 182 constituting the R image pickup unit, the distance from the optical axis of taking lens to the optical axis of the microlens 181 is h. The position of an end of the light receiving area 182 is defined based on a principal ray 185 passing both the center of the exit pupil in the design pupil position and the vertex of the microlens 181.

When the exit pupil position during actual photographing is at the wide end, however, a right luminous flux 184R is larger than a left luminous flux 184L at the exit pupil position, as shown in FIG. 24. In this case, the luminous flux cannot be evenly split into right and left and the larger luminous flux 184R enters the light receiving area 182. For this reason, correlation computation by using an image signal acquired by the light receiving area 182 as it is may reduce AF accuracy.

Then, in order to correct the amount of received light of the L and R image pickup units affected by the difference in the exit pupil sizes asymmetrically split into right and left, an exit pupil position EPZtemp and pupil size EXP are used in computation. As apparent from FIG. 24, a distance d1-temp from the center of an actual exit pupil position to a position where the pupil is split into right and left can be given in the following equation (1), where a design pupil position is EPZ AF1:

$$d1\text{-temp}=h \cdot (\text{EPZ }AF1-\text{EPZtemp})/\text{EPZ }AF1 \quad (1)$$

A left to right pupil split ratio EXPtemp1-$l$ EXPtemp1-$r$ may be:

$$\text{EXPtemp1-}l\text{:EXPtemp1-}r=(\text{EXP}/2)+d1\text{-temp:}(\text{EXP}/2)-d1\text{-temp} \quad (2)$$

The pupil split ratio in the above equation (2) can be used to correct unevenness in splitting the pupil into right and left. The following equation (3) shows a function for determining a corrected image signal, where an image signal before correction is RawAFsignal and the corrected image signal is CorAFsignal:

$$\text{Cor}AF\text{signal}=\text{Raw}AF\text{signal} \cdot g(\text{EXP,EXPtemp1-}l, \text{EXPtemp1-}r). \quad (3)$$

Specifically, for example, a corrected image signal CorAFsignal$r$ of the image signal acquired from the R image pickup unit and a corrected image signal CorAFsignal$l$ of the image signal acquired from the L image pickup unit can be determined by the following equations (4):

$$\text{Cor}AF\text{signal}r=\text{Raw}AF\text{signal}r \cdot (\text{EXPtemp1-}l/\text{EXP})$$

$$\text{Cor}AF\text{signal}l=\text{Raw}AF\text{signal}l \cdot (\text{EXPtemp1-}r/\text{EXP}). \quad (4)$$

According to the equation (4), it is possible to correct the unevenness in splitting the pupil into right and left due to the deviation of an actual pupil position from a design pupil position, and sufficiently accurate focusing can be achieved through correlation computation by using the corrected image signal.

FIG. 25 shows an example where an actual exit pupil position is at a tele end with respect to a design pupil position. In a pixel composed of a microlens 186 and a light receiving area 187 constituting the R image pickup unit, the distance from the optical axis of taking lens to the optical axis of the microlens 186 is h. The position of an end of the light receiving area 187 is defined based on a principal ray 189 passing both the center of the exit pupil in the design pupil position and the vertex of the microlens 186.

When the exit pupil position during actual photographing is at the tele end, however, a right luminous flux 184R is smaller than a left luminous flux 184L at the exit pupil position, as shown in FIG. 25. In this case, the luminous flux cannot be evenly split into right and left and the smaller luminous flux 184R enters the light receiving area 187. For this reason, correlation computation by using an image signal acquired by the light receiving area 187 as it is may reduce AF accuracy.

Then, in order to correct the amount of received light of the L and R image pickup units affected by the difference in the exit pupil sizes asymmetrically split into right and left, an exit pupil position EPZtemp and pupil size EXP are used in computation. As apparent from FIG. 25, a distance d2-temp from the center of an actual exit pupil position to a position where the pupil is split into right and left can be given in the following equation (5), where a design pupil position is EPZ AF2:

$$d2\text{-temp}=h \cdot (\text{EPZtemp}-\text{EPZ }AF2)/\text{EPZ }AF2 \quad (5)$$

A left to right pupil split ratio EXPtemp2-$l$:EXPtemp2-$r$ may be:

$$\text{EXPtemp2-}l\text{:EXPtemp2-}r=(\text{EXP}/2)+d2\text{-temp} \cdot (\text{EXP}/2)-d2\text{-temp} \quad (6)$$

The following equation (7) shows a function for determining a corrected image signal by using the pupil split ratio in the above equation (6):

$$\text{Cor}AF\text{signal}=\text{Raw}AF\text{signal} \cdot g(\text{EXP,EXPtemp2-}l, \text{EXPtemp2-}r). \quad (7)$$

Specifically, for example, a corrected image signal CorAFsignal$r$ of the image signal acquired from the R image pickup unit and a corrected image signal CorAFsignal$l$ of the image signal acquired from the L image pickup unit can be determined by the following equations (8):

$$\text{Cor}AF\text{signal}r=\text{Raw}AF\text{signal}r \cdot (\text{EXPtemp2-}l/\text{EXP})$$

$$\text{Cor}AF\text{signal}l=\text{Raw}AF\text{signal}l \cdot (\text{EXPtemp2-}r/\text{EXP}). \quad (8)$$

According to the equation (8), it is possible to correct the unevenness in splitting the pupil into right and left due to the deviation of an actual pupil position from a design pupil position, and sufficiently accurate focusing can be achieved through correlation computation by using the corrected image signal.

While the above equations represent computation for correcting image signals by using a ratio of left to right diameters of pupil split luminous flux at an actual exit pupil position, image signals can be corrected by using a ratio of left to right surface areas of pupil split luminous flux. In this case, it is advantageous that AF accuracy can be further improved.

In this way, image signals acquired from one AF pixel defined in association with a design pupil position can be corrected according to the above equation (4) or (8) so as to obtain similar image signals to the case where the exit pupil is evenly split into right and left at the actual exit pupil position. Furthermore, image signals acquired from a plurality of AF pixels defined in association with a plurality of adjacent design pupil positions respectively may be used to obtain one corrected image signal.

FIG. 26 illustrates a method for generating a corrected signal in this case. Consider that one of two AF pixels (not shown) located relatively close to each other is formed with the position of an exit pupil 191 being considered as a design pupil position and the other pixel is formed with the position of an exit pupil 192 being considered as a design pupil position. Also consider that an actual exit pupil position is at the position of an exit pupil 193.

For clarity, luminous fluxes 194L, 194R, 195L, and 195R in FIG. 26 are shown with right and left luminous fluxes, which are generated by splitting the exit pupil 193 into right and left, being displaced from the position of the exit pupil 193. When the AF pixel, the design pupil position of which is at the position of the exit pupil 191, is an R pixel, the luminous flux 194R enters the light receiving area, and when the AF pixel is an L pixel, the luminous flux 194L enters the light receiving area. Similarly, when the AF pixel, the design pupil position of which is at the position of the exit pupil 192, is an R pixel, the luminous flux 195R enters the light receiving area, and when the AF pixel is an L pixel, the luminous flux 195L enters the light receiving area.

With the knowledge of the exit pupil position of the exit pupil 193, the design pupil positions of the exit pupils 191 and 192, and a distance (h) between the optical axes of microlens of the two AF pixels corresponding to the design pupil positions and the optical axis of taking lens, image signals acquired from the two AF pixels can be corrected according to the above equations (4) and (8), as described in connection with FIGS. 24 and 25 and the above equations.

Assume a corrected image signal obtained through the computation of above equation (4) for an image signal from the AF pixel, the design pupil position of which is at the position of the exit pupil 191, as CorAFsignal-1, and a corrected image signal obtained through the computation of above equation (8) for an image signal from the AF pixel, the design pupil position of which is at the position of the exit pupil 192, as CorAFsignal-2. In the example in FIG. 26, these two corrected image signals are weighted based on distances "a" and "b" between the design pupil positions and the actual exit pupil position and added together to obtain one corrected image signal. For example, a corrected image signal CorAFsignalAVE through such a weighted addition can be obtained from the following equation (9):

$$\text{Cor}AF\text{signalAVE} = \{wa(a,b) \cdot \text{Cor}AF\text{signal-1} + wb(a,b) \cdot \text{Cor}AF\text{signal-2}\}/\{wa(a,b) + wb(a,b)\}. \quad (9)$$

where wa(a,b) and wb(a,b) are weighting coefficients, and for example, wa(a,b)=b/(a+b), wb(a,b)=a/(a+b).

For example, in such cases where the actual exit pupil position is not close to the design pupil position, corrected image signals for two AF pixels corresponding to two design pupil positions close to the actual exit pupil position can be subjected to the weighted addition to obtain reliable image signals. Consequently, even when the actual exit pupil position is relatively far away from the design pupil position, sufficient AF accuracy can be secured.

Description has been made above to examples where an L or R pixel is used as the AF pixel. However, if a picked-up image includes a large number of horizontal lines, images obtained by the L image pickup unit and the R image pickup unit may be matched with each other even in case of out focus. In this case, an exit pupil may for example be split into upper and lower and a U image pickup unit that receives light from the upper side and a D image pickup unit that receives light from the lower side may be provided. Focusing can be achieved by comparing a phase of an image signal obtained by a plurality of U image pickup units with a phase of an image signal obtained by a plurality of D image pickup units to detect focus deviation.

Even in this case, it is possible to perform correction as shown in FIGS. 24 to 26, and the distance from an optical axis of taking lens may be assumed as an image height h.

Circuit Configuration

As shown in FIG. 16, a body enclosure (not shown) of the image pickup apparatus 101 is provided with a body circuit section 110 therein, and an interchangeable lens section 120, which is removably attached to the body enclosure, is provided with an interchangeable lens circuit section 121. The body circuit section 110 is provided with a communication section 112, and the interchangeable lens circuit section 121 is provided with a communication section 123. The communication section 112 of the body circuit section 110 is adapted to transmit and receive information to and from the communication section 123 of the interchangeable lens circuit section 121

The interchangeable lens 120 includes a taking lens 126. The taking lens 126 is provided with an autofocus function driven by a drive section 125 to achieve focusing. The taking lens 126 includes a zoom function driven by a drive section 125. A single focus taking lens may be used as the interchangeable lens 120.

A lens control section 122 of the interchangeable lens 120 is adapted to control the drive section 125 according to a signal from the body circuit section 110 or a signal based on an user operation from an operation section 124 to drive the taking lens 126 for controlling the diaphragm, focusing, zooming, and the like in the taking lens 126.

The communication section 123 of the lens control section 122 transmits and receives information to and from the communication section 112 of the body circuit section 110 through a predetermined transmission line. Once the communication is established with the communication section 112 of the body circuit section 110, the lens control section 122 can cause the communication section 123 to transmit information on the lens stored in a lens memory 127 to the body circuit section 110.

In the embodiment, the lens memory 127 is adapted to store information on the lens, such as diaphragm position, diaphragm size, exit pupil position, exit pupil size, focusing lens position, image height, and information on eclipses or the like. This allows the body circuit section 110 to recognize information of the interchangeable lens 120 such as zoom magnification, focal length, and f-number, and also to obtain information required for correcting image signals of AF pixels.

The body circuit section 110 includes an image pickup unit 114 composed of an image pickup device such as a CMOS sensor. The image pickup unit 114 includes a light receiving section 114a that receives light of an object from the interchangeable lens 120. An optical image of the object from the interchangeable lens 120 is formed on the light receiving section 114a.

Figure 27:
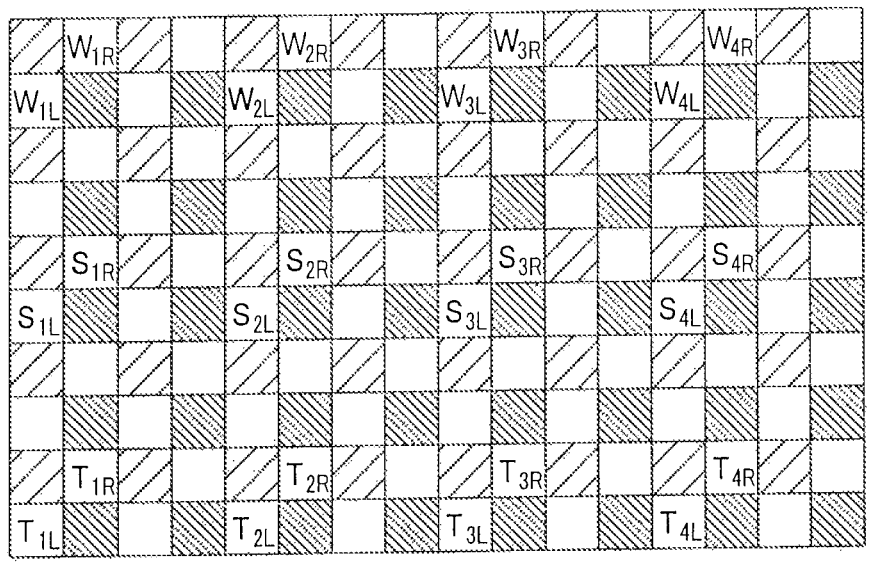
FIG. 27 is an explanatory diagram illustrating an example of a pixel arrangement of the light receiving section 114$a$ in FIG. 16.

FIG. 27 is an explanatory diagram illustrating an example of a pixel arrangement of the light receiving section 114a in FIG. 16. In the embodiment, description will be made to an example where the Bayer arrangement is used as a pixel arrangement. In FIG. 27, a box represents a pixel, and a sparse hatching represents a red pixel with a red filter disposed thereon, a dense hatching represents a blue pixel with a blue filter disposed thereon, and a hollow hatching represents a green pixel with a green filter disposed thereon. In addition, characters in the boxes represent AF pixels, and a character "W" denotes a pixel, the design pupil position of which is set to a wide end, a character "S" denotes a pixel, the design pupil position of which is set to a reference position, and a character "T" denotes a pixel, the design pupil position of which is set to a tele end.

Further, a pixel with a character for an AF pixel accompanied by suffixes including "L" is an L pixel, and a pixel with a character for an AF pixel accompanied by suffixes including "R" is an R pixel. A numeral included in suffixes of a character for an AF pixel corresponds to a distance h between an optical axis of microlens of each AF pixel and the optical axis of taking lens in the horizontal direction, the same numeral denotes the same distance h.

When the correction method in FIG. 26 is used, the correction accuracy may be higher when two pixels corresponding to design pupil positions adjacent to each other among plural types of design pupil positions are close to each other. For this reason, AF pixels may advantageously be positioned in association with plural design pupil positions to be defined. For example, when three types of design pupil positions, the wide end, the reference position, and the tele end, are to be defined, AF pixels corresponding to the design pupil positions are positioned at the wide end, the reference position, and the tele end, or at the tele end, the reference position, and the wide end, in this order.

The light receiving section 114a shown in FIG. 27 includes three types of pixels set to three design pupil positions as AF pixels. Specifically, AF pixels W1L, W2L, . . . , W1R, W2R, . . . , the design pupil positions of which are set to the wide end; AF pixels S1L, S2L, . . . , S1R, S2R, . . . , the design pupil positions of which are set to the reference position; and AF pixels T1L, T2L, . . . , T1R, T2R, . . . , the design pupil positions of which are set to the tele end.

The image pickup unit 114 is controlled and driven by a signal processing and control section 111. The light receiving section 114a of the image pickup unit 114 photoelectrically converts an optical image from an object and outputs an image signal. The signal processing and control section 111 is provided with a signal extracting section 111a, and the signal extracting section 111a captures the image signal from the image pickup unit 114. The signal extracting section 111a is adapted to output the captured image signal to an image processing section 111b and to output image signals from AF pixels to a correcting section 111c.

The correcting section 111c is supplied with a judgment result from a pupil position judging section 111d. The correcting section 111c corrects an error in an image signal caused by the fact that the sizes of incident luminous fluxes from L and R image pickup units are different from each other because of a difference between design pupil positions defined for AF pixels and the actual exit pupil positions, which leads to uneven splitting of the pupil into right and left.

The correcting section 111c uses judgment results from the pupil position judging section 111d for correcting image signals.

The pupil position judging section 111d is supplied with information on the lens through the communication section 112, and obtains information on AF pixels from a body memory 119. The body memory 119 has stored thereon information on each AF pixel, such as a distance h between an optical axis of microlens of each AF pixel and the optical axis of taking lens.

The pupil position judging section 111d obtains information on the actual exit pupil position from the lens memory 127 and obtains information on a design pupil position defined for an AF pixel from the body memory 119 to determine an AF pixel and a method for correcting an image signal for AF computation. Specifically, when any design pupil position coincides with the actual exit pupil position, the pupil position judging section 111d outputs a judgment result to use the AF pixel corresponding to the design pupil position as it is for AF computation. When no design pupil position coincides with the actual exit pupil position, the pupil position judging section 111d outputs a judgment result to select an AF pixel corresponding to a design pupil position close to the exit pupil position, and judges which correction method described above in FIGS. 24 to 26 is to be used and outputs a judgment result to the correcting section 111c.

The correcting section 111c obtains information on the actual exit pupil position and exit pupil size from the lens memory 127 through the communication section 112, and obtains information on a distance h for each AF pixel and a design pupil position from body memory 119. According to a judgment result of the pupil position judging section 111d, the correcting section 111c either outputs an uncorrected image signal to an AF signal calculating section 111e, or corrects an image signal of an AF pixel by using any of the methods in FIGS. 24 to 26 and outputs the corrected image signal to the AF signal calculating section 111e.

The AF signal calculating section 111e, which is supplied with the corrected image signal of the AF pixel, determines correlation between corrected image signals and calculates an AF signal through a pupil split phase difference method. The signal processing and control section 111 is adapted to achieve focusing by supplying the AF signal calculated by the AF signal calculating section 111e to the drive section 125 through communication sections 112 and 123.

The image processing section 111b of the signal processing and control section 111 performs predetermined signal processing, such as color signal generation, matrix conversion, and other various digital processing, on the image signal from the signal extracting section 111a. The signal processing and control section 111 is also capable of outputting coded and compressed image information, sound information and the like when image and sound signals are recorded.

The body circuit section 110 is also provided with a clock section 115, and an operation judging section 116. The clock section 115 generates time information that is used by the signal processing and control section 111. The operation judging section 116 is adapted to generate operation signals based on an user operation on various switches (not shown) such as a photographing start/stop button and photographing mode settings provided on the image pickup apparatus 101 and output the signals to the signal processing and control section 111. The signal processing and control section 111 controls various sections based on the operation signals.

The body circuit section 110 is also provided with a record and reproduction section 117 and a display section 118. The record and reproduction section 117 can be used to record image information and sound information from the signal processing and control section 111 in a recording media (not shown). A card interface may be used as the record and reproduction section 117, for example, and image information and sound information can be recorded in memory card or the like by the record and reproduction section 117. The record and reproduction section 117 reads the image information and the sound information recorded in the recording media and supplying the information to the signal processing and control section 111. The signal processing and control section 111 is adapted to decode the image information and the sound information from the record and reproduction section 117 to obtain an image signal and a sound signal.

The display section 118 is supplied with a picked-up image from the image pickup unit 114 or a reproduced image from record and reproduction section 117 through the signal processing and control section 111, and can display the images. The display section 118 is capable of displaying menus and the like for operating the image pickup apparatus 101 controlled by the signal processing and control section 111.

When a generated image signal is supplied to the record and reproduction section 117 for recording, the signal processing and control section 111 is adapted to create a file of the image signal recorded based on a user operation. Once a file is created, various processing, such as reproduction, can be performed on the filed image (hereinafter referred to as "image file") based on a user operation.

Figure 28:
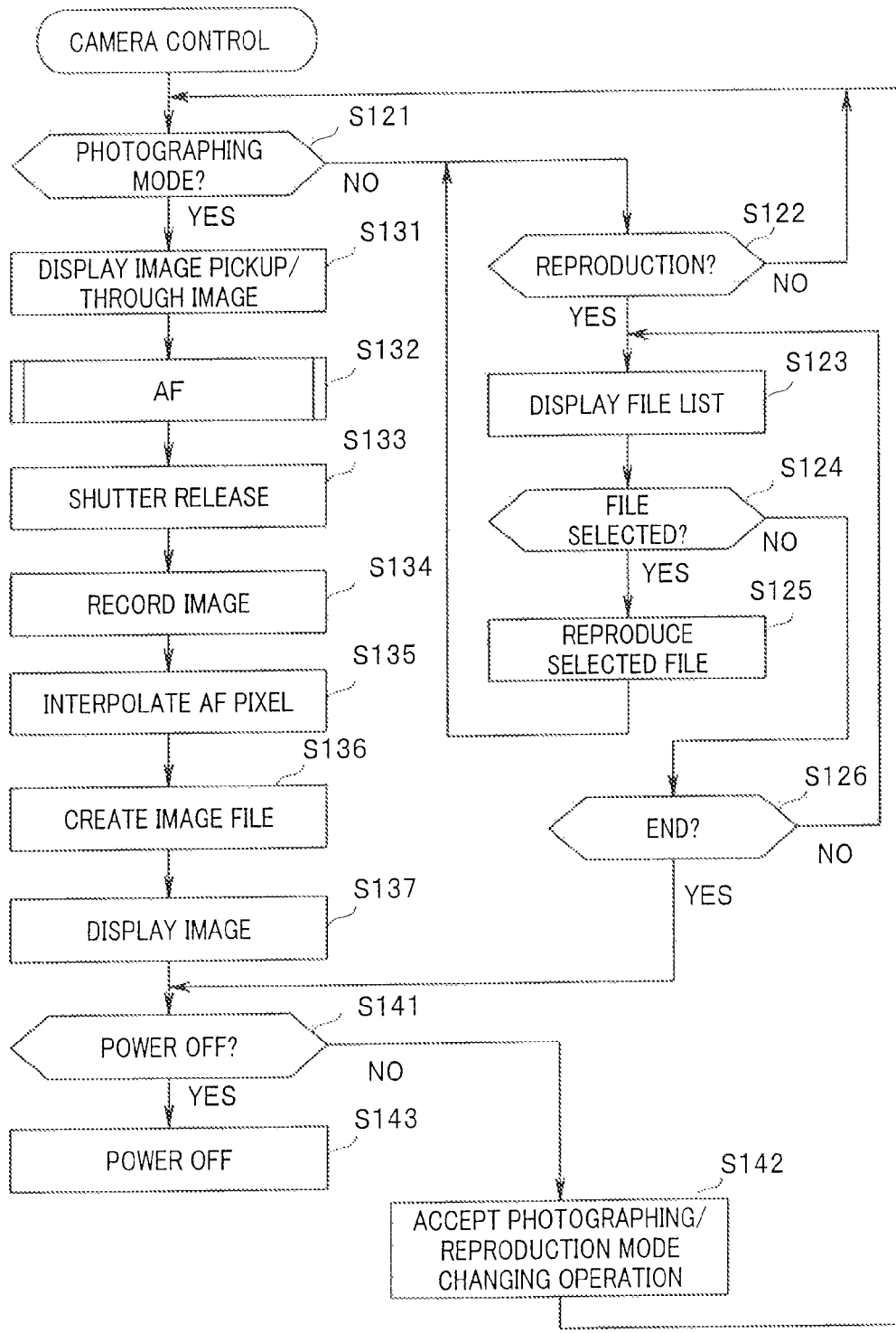
FIG. 28 is a flow chart for illustrating camera control of the third embodiment.
Figure 29:
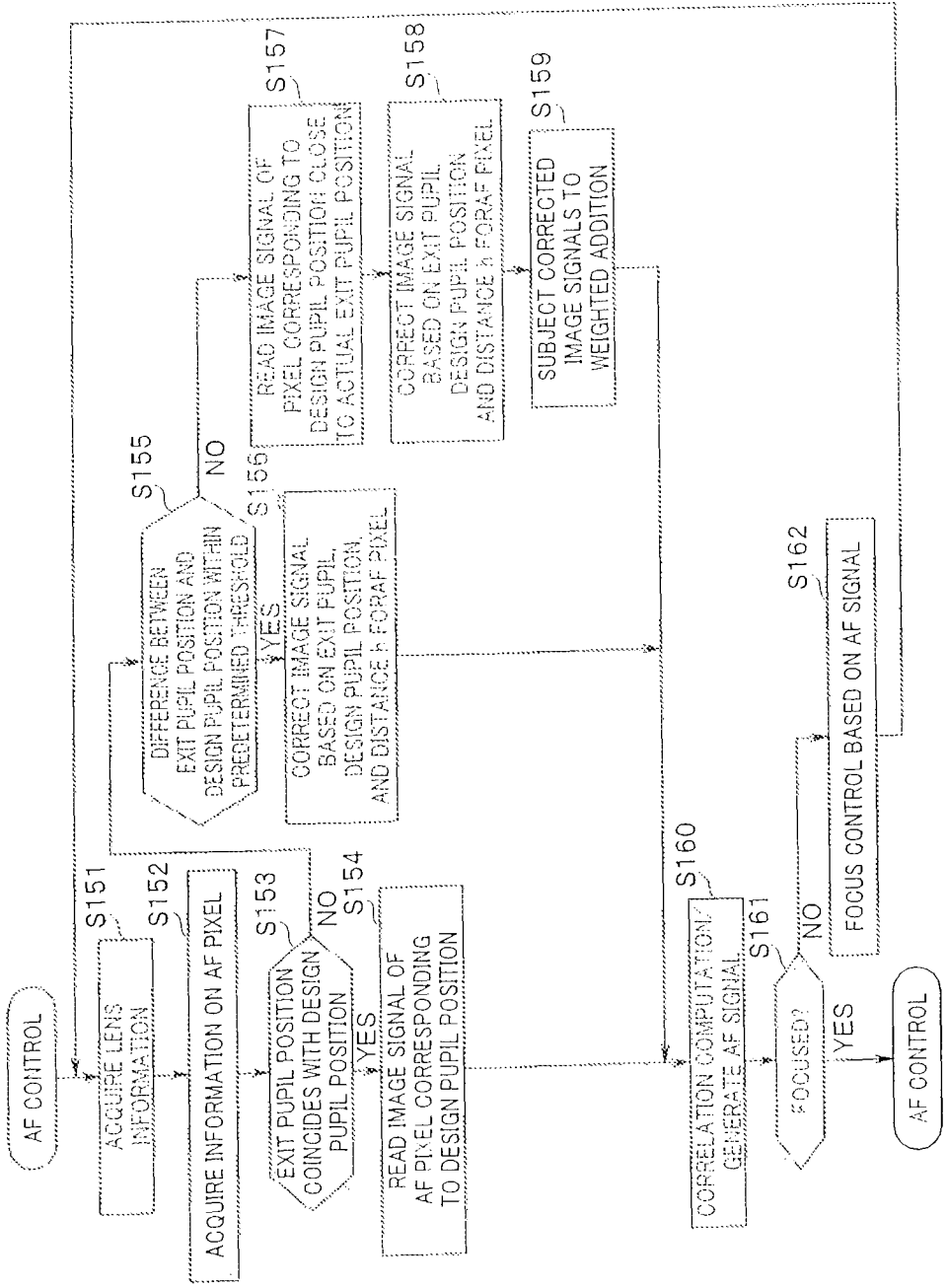
FIG. 29 is a flow chart specifically illustrating AF processing in FIG. 28.

The operation of the embodiment thus configured will now be described with reference to FIGS. 28 and 29. FIG. 28 is a flow chart for illustrating camera control of the third embodiment and FIG. 29 is a flow chart specifically illustrating AF processing in FIG. 28.

When the image pickup apparatus 101 is powered up, the signal processing and control section 111 judges in step S121 in FIG. 28 whether or not a photographing mode is indicated. If the photographing mode is not indicated, the signal processing and control section 111 judges in step S122 whether or not a reproduction mode is indicated. If the reproduction mode is indicated, the signal processing and control section 111 lists thumbnails in step S123. When an image is selected by a user who views the thumbnail list, the process proceeds from step S124 to step S125, and the signal processing and control section 111 reproduces the selected image. When no image is selected, determination is made at step S126 as to whether the reproduction mode should be ended.

Meanwhile, if the photographing mode is indicated, the signal processing and control section 111 causes, in step S131, the display section 118 to display a picked-up image (through image) in live view based on image signals from the image pickup unit 114. In this case, the signal processing and control section 111 supplies the picked-up image from the image pickup unit 114 to the display section 118 after thinning out pixels depending on the number of display pixels of the display section 118.

In the next step S132, focusing is performed in AF processing. Specifically, the signal processing and control section 111 obtains lens information stored in the lens memory 127 through the communication sections 112 and 123, in step S151 in FIG. 29. The signal processing and control section 111 also obtains information on AF pixels stored in the body memory 119, in step S152.

Next, the pupil position judging section 111d of the signal processing and control section 111 judges in step S153 whether the actual exit pupil position coincides with the design pupil position and outputs the judgment result to the correcting section 111c. The pupil position judging section 111d retains information on design pupil positions defined for AF pixels obtained from the body memory 119, and uses the actual exit pupil position information contained in the lens information to judge the coincidence of the exit pupil position with the design pupil position. For example, when a single focus lens with a fixed focal length is used, the exit pupil position may coincide with the design pupil position.

In this case, the correcting section 111c reads an image signal of the AF pixel corresponding to the design pupil position that coincides with the actual exit pupil position, and outputs the signal as it is to the AF signal calculating section 111e (step S154). The AF signal calculating section 111e generates an AF signal through correlation computation by using the read image signal. The AF signal is supplied to the drive section 125 through the communication sections 112 and 123 and focusing is performed (step S160).

When the actual exit pupil position does not coincide with the design pupil position, the process proceeds to step S155, and the pupil position judging section 111d judges whether or not the difference between the exit pupil position and the design pupil position is within a predetermined threshold and outputs the judgment result to the correcting section 111c. If the difference between the exit pupil position and the design pupil position is within a predetermined threshold, the correcting section 111c corrects the image signal by using a correction method as shown in FIG. 24 or 25 (step S156). Specifically, the correcting section 111c performs computation of, for example, the above equation (4) or (8) by using information on the exit pupil, information on the design pupil position, and information on the distance h for the AF pixel to correct the image signal. Next, an AF signal is generated at step S160 and focusing is performed.

Given a judgment result indicative of the difference between the exit pupil position and the design pupil position is larger than a predetermined threshold from the pupil position judging section 111d, the correcting section 111c uses the method in FIG. 26 to correct the image signal. Specifically, the correcting section 111c first reads image signals of a plurality of pixels respectively corresponding to a plurality of design pupil positions close to the actual exit pupil position (step S157). Next, the correcting section 111c corrects each image signal through computation of the above equation (4) or (8) (step S158). Next, the correcting section 111c weights the corrected image signals based on distances between the exit pupil position and the design pupil position, adds the signals together, and determines an average. In this way, one image signal is generated from the plurality of AF pixels. In step S160, then, an AF signal is generated and focusing is performed.

The focus control is repeated until the object is in focus, in steps S161 and S162.

Next, in step S133 in FIG. 28, when photographing is indicated by a shutter release operation, the signal processing and control section 111 performs predetermined signal processing on the image signal from the image pickup unit 114 to generate an image for recording. The signal processing and control section 111 causes a memory (not shown) to record the generated picked-up image (step S134). As for AF pixels in the recorded picked-up image, the signal processing and control section 111 creates image signals of the AF pixel positions through correction by using pixels around the AF pixels to determine image signals as if the AF pixels were composed of image pickup pixels (step S136).

The signal processing and control section 111 supplies the picked-up image whose image signals of AF pixels are corrected to the record and reproduction section 117 for filing (step S136). The signal processing and control section 111 supplies the recorded picked-up image to the display section 118 for rec view (step S137).

In step S141, the signal processing and control section 111 judges whether or not a power off operation is performed. If the power off operation is not performed, the signal processing and control section 111 accepts an operation of changing photographing and reproduction modes (step S142) and then returns the process to step S121. If the power off operation is performed, the signal processing and control section 111 turns off the power (step S143).

In the AF processing in FIG. 29, description has been made to examples where, when the exit pupil position and the design pupil position coincide with each other, only AF pixels corresponding to the coincident design pupil position are used for correlation computation. However, AF pixels corresponding to the design pupil position that does not coincide with may be used for correlation computation through a correction method in FIGS. 24 to 26. Further, any correction method in FIG. 24 or 25 or a correction method in FIG. 26 may be used regardless of whether or not the difference between the exit pupil position and the design pupil position is within a predetermined threshold.

In this way, in the embodiment, the image pickup device includes a plurality of AF pixels formed thereon, the light receiving area of which is respectively defined in association with a plurality of design pupil positions. This allows the pupil to be evenly split into right and left even though the exit pupil position varies, and it is possible to prevent AF accuracy from being degraded. Furthermore, image signals of AF pixels corresponding to design pupil positions relatively close to the exit pupil positions are used for correction, and thereby correction accuracy for AF signals can be improved and sufficient AF accuracy can be obtained.

Fourth Embodiment

Figure 30:
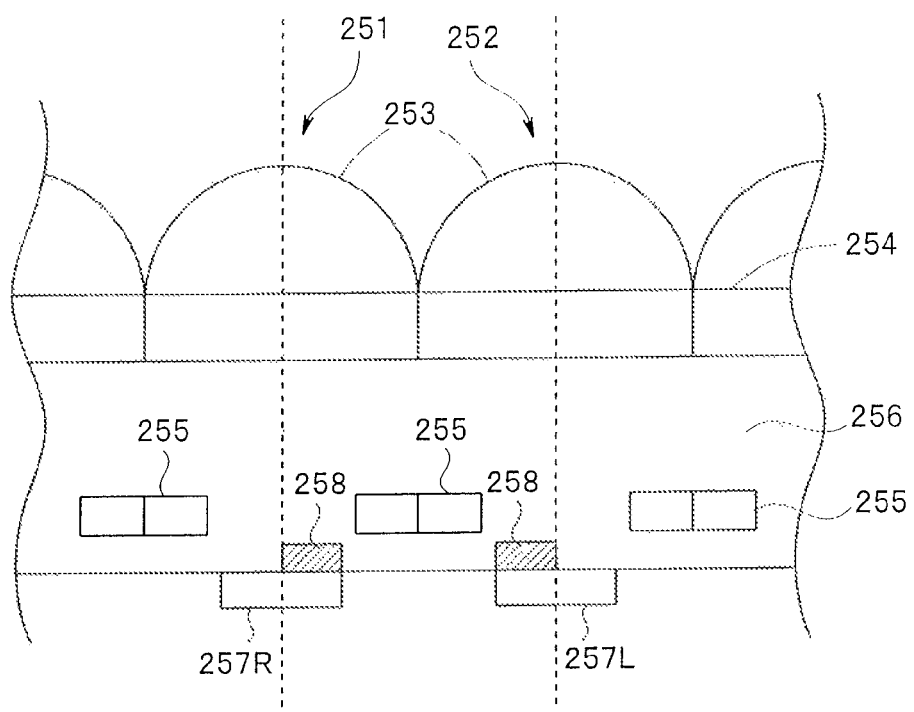
FIG. 30 is an explanatory diagram illustrating a configuration of a pixel located close to an optical axis of taking lens among respective pixels constituting an image pickup device used in a fourth embodiment.
Figure 31:
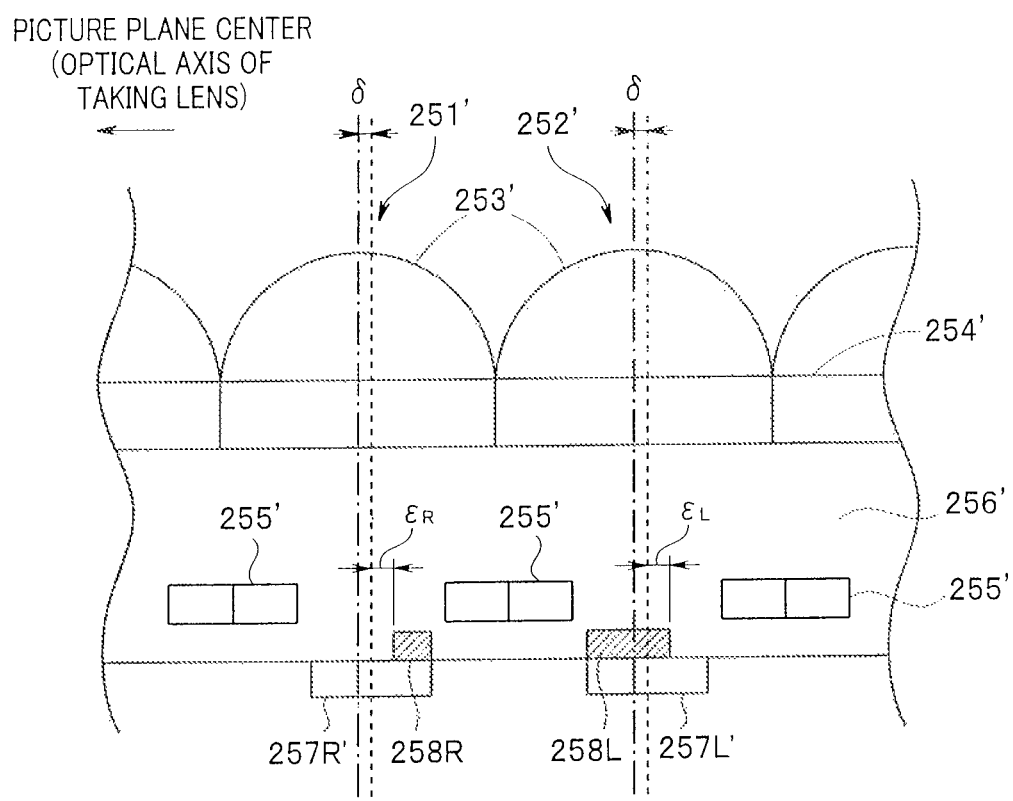
FIG. 31 is an explanatory diagram illustrating a configuration of a pixel on the periphery of an optical axis of taking lens among respective pixels constituting an image pickup device used in the fourth embodiment.

FIGS. 30 and 31 are explanatory diagrams illustrating a fourth embodiment of the invention. The hardware configuration in the embodiment is similar to that in the third embodiment, with a slight exception in the configuration of the image pickup device.

In the third embodiment, a plurality of AF pixels are used, the light receiving area of which is respectively defined in association with a plurality of design pupil positions. Description has been made on the assumption that the entire light receiving area in that case can be used as a photoelectric conversion area. In contrast, the embodiment illustrates an example of using AF pixels in which a portion of a light receiving area where light can enter and effectively receive the light (hereinafter referred to as "effective light receiving area") is limited by a light shielding section.

FIG. 30 is an explanatory diagram illustrating a configuration of a pixel located close to an optical axis of taking lens among pixels constituting an image pickup device, and FIG. 31 is an explanatory diagram illustrating a configuration of a pixel on the periphery of the optical axis of taking lens among pixels constituting the image pickup device.

FIGS. 30 and 31 show examples where pixels 251 (251') and 252 (252') are R and L pixels, respectively. Each pixel, including the pixels 251 (251') and 252 (252'), is provided with a microlens 253 (253'), color filter 254 (254'), a light shielding film 255 (255') for preventing colors of color pixels from being mixed, a smoothing layer 256 (256') for providing a planar surface on which color filter layers are disposed, and a light receiving area in this order from the top. The light receiving area is shielded by a light shielding section 258 (258R, 258L) (obliquely hatched portion). Shielded by the light shielding sections 258 and 258R, the light receiving areas 257R and 257R constitute R image pickup units, and the pixels 251 and 251' serve as R pixels. Similarly, shielded by the light shielding sections 258 and 258L, the light receiving areas 257L and 257L' constitute L image pickup units, and the pixels 252 and 252' serve as L pixels.

Dashed lines in FIG. 30 represent optical axes for different microlenses 253. The light receiving areas 257R and 257L, which constitute the R image pickup unit and the L image pickup unit, is shielded by the light shielding section 258, and an end of each of the effective light receiving areas that effectively receive light coincide with the optical axis of the microlens 253 as shown in FIG. 30.

Since the pixels 251 and 252 are close to the optical axis of taking lens, the optical axes of the microlens 253 of the pixels 251 and 252 are substantially parallel to the optical axis of taking lens (not shown) and the optical axis of the microlens 253 and the optical axis of taking lens substantially coincide with each other. The effective light receiving area of the light receiving area 257R therefore receives a right part of a luminous flux passing through the exit pupil and evenly split into right and left, and the effective light receiving area of the light receiving area 257L receives a left part of a luminous flux passing through the exit pupil and evenly split into right and left. This means that the luminous flux passing through the exit pupil is evenly split into right and left and enters the light receiving areas 257R and 257L.

Meanwhile, on the periphery of the picture plane, the effective light receiving areas are designed to be displaced relative to the optical axis of the microlenses 253' (long dashed short-dashed line) by a distance δ in order to avoid shading. On the periphery of the picture plane, this can be simplified as a configuration shown in FIG. 31.

In the case where a pixel is displaced from the vicinity of the optical axis of taking lens, a principal ray is not parallel to the optical axis of the microlens 253. In this case, in order to evenly split a luminous flux passing through the exit pupil and direct them to the L image pickup unit and the R image pickup unit, one end of the effective light receiving area, which constitutes each of the L and R image pickup units, needs to be located on an axis passing both the vertex of the microlens 253 and the center of the exit pupil.

As shown in FIG. 31, then, the light shielding sections 258R and 258L are provided on the light receiving areas 257R and 257L, respectively, and areas shielded by the light shielding sections 258R and 258L are displaced from the optical axes by εR and εL, respectively. Consequently, the balance between R and L outputs struck when rays parallel to the optical axes of the microlenses 253 enter a pair of AF pixels 251 and 252 can be equalized to the balance between R and L outputs struck when rays that are not parallel to the optical axes of the microlenses 253' enter a pair of AF pixels 251' and 252'.

With AF pixels thus designed, positions of one end of the effective light receiving areas are set in association with a plurality of design pupil positions in a similar way to the third embodiment described above. Specifically, the embodiment can be implemented by replacing the light receiving area in the third embodiment with the effective light receiving area determined by the light shielding section and the light receiving area, and displacing the effective light receiving area from the optical axis only by δ on the periphery of the picture plane in consideration of avoiding shading.

In this way, in the embodiment, the image pickup device includes a plurality of AF pixels formed thereon, the effective light receiving area of which is respectively defined in association with a plurality of design pupil positions. This allows the pupil to be evenly split into right and left even though the exit pupil position varies, and it is possible to prevent AF accuracy from being degraded Furthermore, image signals of AF pixels corresponding to design pupil positions relatively close to the exit pupil positions are used for correction, and thereby correction accuracy for AF signals can be improved and sufficient AF accuracy can be obtained. In addition, since the effective light receiving area on the periphery of the picture plane is displaced from the optical axis in consideration of avoiding shading, highly accurate AF signals can be obtained over the entire picture plane.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus, comprising:
    an image pickup device including a plurality of pixels arranged in a matrix, the pixels including an image pickup pixel and pixel for focus detection,
    the pixels each comprising:
        a light receiving area on which light from a taking lens impinges; and
        a microlens that directs light from the taking lens to the light receiving area, wherein plural types of pixels for focus detection are provided in association with a plurality of assumed design pupil positions, and an end of the light receiving area of the pixel for focus detection is defined in association with a positional relationship between the design pupil position and the microlens, wherein the design pupil positions are positions of assumed exit pupils;
    a pupil position determining section that determines a pixel for focus detection to be used for focus detection by comparing an exit pupil position with the plurality of design pupil positions;
    a correcting section that corrects an image signal from the pixel for focus detection to be used for focus detection when the exit pupil position is inconsistent with the design pupil position, based on information on an exit pupil, information of the design pupil position, and information of the pixel for focus detection to be used for focus detection to obtain a corrected image signal; and
    a focus detecting section that detects a focal point by using the corrected image signal corrected by the correcting section.

2. The image pickup apparatus according to claim 1, wherein the correcting section corrects an image signal from the pixel for focus detection to be used for focus detection based on an uneven right and left pupil split ratio that is based on a difference between the exit pupil position and the design pupil position.

3. The image pickup apparatus according to claim 1, wherein the correcting section obtains another corrected image signal by subjecting a plurality of corrected image signals for a plurality of image signals from a plurality of pixels for focus detection corresponding to a plurality of design pupil positions to a weighted addition.

4. The image pickup apparatus according to claim 2, wherein the correcting section obtains another corrected image signal by subjecting a plurality of corrected image signals for a plurality of image signals from a plurality of pixels for focus detection corresponding to a plurality of design pupil positions to a weighted addition.

5. The image pickup apparatus according to claim 1, further comprising: a communication section that acquires information of the exit pupil position and information of the design pupil position; and a memory that stores information of the pixel for focus detection to be used for focus detection.

6. An image pickup device including a plurality of pixels arranged in a matrix, the pixels including an image pickup pixel and a pixel for focus detection based on a pupil split phase difference method,
    the pixels each comprising:
        an effective light receiving area that is a part of a photoelectric conversion area and on which light regulated by a light shielding section from a taking lens impinges; and
        a microlens that directs light from the taking lens to the effective light receiving area at a displaced position corresponding to a phase shift,
    wherein an end of the effective light receiving area of the pixel for focus detection in a direction of the phase shift is defined in association with a positional relationship between an assumed design pupil position and the microlens,
    wherein the assumed design pupil position is a position of an assumed exit pupil.

7. An image pickup apparatus, comprising:
    the image pickup device according to claim 6;
    a pupil position determining section that judges which one of the plurality of design pupil positions an exit pupil position coincides with and determines a pixel for focus detection to be used for focus detection based on a judgment result; and
    a focus detecting section that detects a focal point by using the pixel for focus detection to be used for focus detection.

8. An image pickup apparatus, comprising:
    the image pickup device according to claim 6;
    a pupil position determining section that determines a pixel for focus detection to be used for focus detection by comparing an exit pupil position with the plurality of design pupil positions;
    a correcting section that corrects an image signal from the pixel for focus detection to be used for focus detection when the exit pupil position is inconsistent with the design pupil position, based on information on an exit pupil, information of the design pupil position, and information of the pixel for focus detection to be used for focus detection to obtain a corrected image signal; and
    a focus detecting section that detects a focal point by using the corrected image signal corrected by the correcting section.

9. The image pickup apparatus according to claim 8, wherein the correcting section corrects an image signal from the pixel for focus detection to be used for focus detection based on an uneven right and left pupil split ratio that is based on a difference between the exit pupil position and the design pupil position.

10. The image pickup apparatus according to claim 8, wherein the correcting section obtains another corrected image signal by subjecting a plurality of corrected image signals for a plurality of image signals from a plurality of pixels for focus detection corresponding to a plurality of design pupil positions to a weighted addition.

11. The image pickup apparatus according to claim 7, further comprising: a communication section that acquires information of the exit pupil position and information of the design pupil position; and a memory that stores information of the pixel for focus detection to be used for focus detection.

* * * * *